United States Patent [19]
Ruben

[11] Patent Number: 5,245,441
[45] Date of Patent: Sep. 14, 1993

[54] DOCUMENT IMAGING PROCESSING METHOD AND APPARATUS

[76] Inventor: Murray A. Ruben, 95 Pinehurst Rd., Belmont, Mass. 02178

[21] Appl. No.: 806,102

[22] Filed: Dec. 12, 1991

[51] Int. Cl.[5] .............................................. H04N 1/41
[52] U.S. Cl. .................................... 358/426; 358/451; 358/261.1; 358/448; 358/500; 358/453; 382/47
[58] Field of Search ............... 358/261.1, 261.2, 261.3, 358/261.4, 426, 451, 452, 453, 75, 448, 427; 382/47; 340/731

[56] References Cited

U.S. PATENT DOCUMENTS

| | | | |
|---|---|---|---|
| 4,509,194 | 4/1985 | Harrington | 358/261.3 |
| 4,542,413 | 9/1985 | Rallapalli et al. | 358/261.4 |
| 4,558,371 | 12/1985 | Rallapalli et al. | 358/261.3 |
| 4,562,484 | 12/1985 | Rallapalli et al. | 358/261.3 |
| 4,716,471 | 12/1987 | Yikomizo | 358/296 |
| 4,760,461 | 7/1988 | Sato | 358/261.4 |
| 4,807,043 | 2/1989 | Kaku et al. | 358/261.3 |
| 4,839,738 | 6/1989 | Kaku et al. | 358/261.4 |
| 5,020,115 | 5/1991 | Black | 358/451 |
| 5,048,117 | 9/1991 | Yamashita | 358/426 |
| 5,068,905 | 11/1991 | Hackett et al. | 358/451 |
| 5,097,518 | 2/1990 | Scott et al. | 358/428 |

OTHER PUBLICATIONS

"Facsimile Coding Schemes and Coding Control Functions for Group 4 Facsimile Apparatus", CCITT Recommendation T.6, Fascicle VII.3 (1988), pp. 48–56.
Electrical Schmeatic of OAK OT95C71 Compression, Expansion Processor Circuit, 1991.

Primary Examiner—Edward L. Coles, Sr.
Assistant Examiner—Fan Lee
Attorney, Agent, or Firm—Hamilton, Brook, Smith & Reynolds

[57] ABSTRACT

Compression expansion processor apparatus and method is provided for document image processing. The apparatus creates a virtual 1:1 image stream within, and represents this stream logically as a series of run length codes instead of physically as a fully decoded bit stream. The apparatus and method directly compute the required output bit streams from this internal run length representation. The time wasted generating and discarding clipped pixels is eliminated. An input parsing function does not have to recompute the previous line's run lengths. Individual color run lengths are retained through-out the clipping and scaling processes, making gray level correction techniques easier to apply.

20 Claims, 8 Drawing Sheets

DOCUMENT IMAGING PROCESSING METHOD AND APPARATUS

BACKGROUND OF THE INVENTION

CCITT (the International Telegraph and Telephone Consultative Committee) defines a raster image stream as a series of YH raster lines, each containing XW picture elements called pels. The stream begins at the upper left corner of the image and is scanned left to right, top to bottom. Each raster line is represented as a series of alternating run lengths corresponding to consecutive white and black pels.

As a standard for facsimile transmissions, CCITT specifies what is known as variable run length coding formats, into which such input streams should be encoded. More accurately, the CCITT Group 3 and Group 4 facsimile specifications define two coding schemes. One CCITT coding scheme is a "one-dimensional" method which converts input pel run lengths into variable length codes statistically chosen so that the most common run lengths can be represented with the fewest number of bits. This is known as the Modified Huffman scheme. The basis for this approach is that documents, preferably defined as black printed on a white background, contain short black pel runs and lots of long white pel runs. The CCITT also defines a "two-dimensional" encoding method, in which the spacing of pixel runs on the previous scan line is used as a reference to encode the current scan line. This method attempts to benefit from the fact that most printed characters have significant vertical correlation between adjacent scan lines. The CCITT coding schemes are described in the CCITT Fascicle VII.3, Recommendation T4 and T6, pages 21-57 (1989), herein incorporated by reference.

Further the CCITT encoding methods, and the Group 4 facsimile specifications in particular, have been widely applied to document image processing applications in which mostly black on white documents are optically scanned, encoded, stored in optical or magnetic media, retrieved, decoded, and then output for printing or display purposes. For example, the modern facsimile machine essentially performs most of these steps. The special properties of the CCITT bi-level image encoding method often results in data compression ratios exceeding 15:1, so that A4 sized documents scanned at 200 dots per inch (i.e., 1784 bits per line by 2200 lines or 490 kB) often require less than 30 kB once encoded. This enables modern facsimile machines to transmit most pages in under 60 seconds.

In addition to the basic CCITT encoding and decoding functions, document image processing applications often require an image to be clipped, scaled, enhanced, flipped orthogonally, and adjusted to correct for small skew angles introduced during the scanning process. Skew correction improves the quality of displayed images, since such images lose resolution going from a 200 dpi (dots per inch) scan to a typical 100 dpi screen. Skew correction may also improve the quality and speed of optical character recognition software that is often used to attempt to "read" scanned document fields.

Current state of the art VLSI CCITT Compression Expansion Processor (CEP) circuits such as the OAK OT95C71 have been designed to primarily support facsimile applications. These circuits follow the above described CCITT coding schemes. One disadvantage of such circuits is that they do not provide any clipping, scaling or rotation (CSR) functionality as that required by document image processing applications. To date, CSR function is currently performed separately in a processing unit that is forced to operate upon the fully decoded CEP physical output raster stream, even though much of this data stream will eventually be eliminated from the clipped and scaled output data stream.

For instance, graphical user interfaces (GUI) such as Windows 3.0, Macintosh, and X Windows all represent a desk top as consisting of a stack of images (pages or "windows") randomly overlapping each other. Usually there is one top or active "window" at a time. If the dimensions or position of any window is modified by moving or resizing operations, rectangular, not necessarily adjacent, pieces of one or more underlaying windows can be become uncovered, requiring a redraw operation known as "repainting". Repainting attempts to minimize system bus bandwidth by restoring only uncovered pixels using pixel block transfer (PIXBLT) or regeneration techniques.

For low resolution screens, the number of off screen bytes needed to save or reload each individual image is moderate and the PIXBLT technique is widely used during repaint. But high resolution screens (greater than 1200 pixels or rows) require a larger amount of off screen memory and a potentially large amount of bus bandwidth in order to use the PIXBLT technique. A 1664 by 1200 screen is roughly 6.5 times the size of a 640 by 480 VGA screen, and a 1784 by 2400 screen is nearly 14 times this size. These screens represent typical document image processing resolutions needed to achieve full screen real size images of A4 sized documents.

For this reason it is desirable to repaint uncovered pixels using the regeneration technique. In that case, the encoded image is already stored in so no additional memory is required for "off screen" copies. There is usually less overall memory bandwidth required to transfer subject image data. For example, to repaint 50% of a 1664 by 1200 image requires 832 by 1200 or 125 kB of temporary storage versus 30 kB for the compressed image. This extra memory is eliminated, and so is the extra U bandwidth requirement to move the additional 95 kB. These numbers become optimal as the display resolution increases or the repaint area increases. At VGA screen levels, the entire 640 by 480 screen occupies 38 kB and the off screen method works just fine.

However, the uncovered pixels in a repaint operation are not necessarily limited to one region of the screen, and while each region can in itself be constructed of overlapping rectangular components, each region is not necessarily a rectangle. Accordingly, there is a need to represent multiple rectangular repaint regions and to decode a file representing the original input 1:1 image pixel screen into multiple scaled output streams, each with its own clipping and window parameters. In this context, "clipping" refers to the process of discarding input stream pixels, and "windowing" refers to the process of selecting input stream pixels. Both "clipping" and "windowing" are mutually exclusive versions of the same basic selection process. For purposes of the following description, these terms are used interchangeably.

Within each repaint rectangle, a completely predictable pixel pattern must be generated so that resulting images can be pasted into repainted regions with pixel perfect alignment. Also, subword sized pixel streams appearing at each paint rectangle's right and left borders need to be merged with on-screen pixels. This is a problem for the DMA Bus Controller. This requires a scaling algorithm capable of precise repeatability.

Scale factors are represented herein as a ratio of two integers, denoted as N/M. This representation produces precisely N output pixels for every M input pixels. The problem which exists relates to how to handle randomly sized input pixel runs, or runs that do not start or end on M unit boundaries. Randomly selected clipping windows have this later boundary matching problem. Note, also that the X and Y dimension scale factors are not necessarily identical, although it may be assumed that they will not differ by more than some reasonable amount, typically 4:3 or 2:1.

The CCITT scheme is completely lossless, so that every pixel appearing in the original image is represented in the decoded 1:1 image stream. The scaling process is lossy however, and can result in the loss of entire black or white pixel runs during image reduction. Various image enhancement schemes will be needed to minimize this loss effect. Similarly edge definition becomes exaggerated and jagged when an image is enlarged and this effect also needs to be minimized.

SUMMARY OF THE INVENTION

The present invention provides document image processing method and apparatus for solving the problems of the prior art. In particular, the present invention provides a VLSI scalable compression expansion processor chip design which is able to encode input bi-level raster image streams into the variable run length coding formats defined by the CCITT Group 3 and Group 4 facsimile specifications, and to decode, clip, scale and assist in the rotation of CCITT encoded images back into an output raster stream conforming to the specified window and scaling parameters. In a preferred embodiment the invention chip design creates a virtual 1:1 image stream inside the chip, represents this stream logically as a series of run length codes instead of physically as a fully decoded bit stream, and directly computes the required output bit streams from this internal run length representation.

In the preferred embodiment, the present invention improves a document image processing system having (i) a source end providing an input stream of either encoded image data or working data, and (ii) an output end for providing one of decoded image data and compressed image data. The present invention improvement includes a parser coupled to the source end for generating code instructions for processing the encoded and working image data. The code instructions include clipping and scaling parameters. Also included is a scaler coupled to the output end and spaced from the parser for forming decoded image data according to the code instructions generated by the parser. The scaler forms the decoded image data corresponding to encoded image data in the input stream at the same point in the input stream.

According to an aspect of the present invention, there is an internal buffering means between the parser and scaler for storing processing information including line length, scaling parameter and address offsets to support each horizontal and vertical working window region formed by the subject image data. The parser manages the internal buffering means such that the scaler receives processing information corresponding to encoded image data at the time the scaler processes the encoded image data.

Further, the parser manages the internal buffering means such that a line count of image data is separated from line length and is eliminated.

In accordance with another aspect of the present invention, a code generator coupled between the internal buffering means and scaler is employed for enabling windowing during processing of working image data.

In addition to the foregoing, the scaler further generates gray color codes for formed decoded image data corresponding to encoded image data. To that end, gray level image data is output for the decoded image data. More generally, run length encoded image data is decoded by the present invention apparatus and method for display of document images supported by the input image data. And working image data representing a document image is run length encoded by the present invention for facsimile transmission and the like.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

In the CCITT compression expansion processor circuit designs, Applicant has found that the sole purpose of the processor is to decompress or compress the images from the coded state to the fully expanded 1:1 state and vice versa. The clip, scale, and rotate (CSR) function is only able to access this 1:1 fully expanded image and the entire physical stream must cross at least one pair of chip boundaries. This consumes extra pins, power, and time (to traverse the clipped regions of the 1:1 stream at the maximum bandwidth provided by the connection cross section). This is 16 bits per handshake cycle in the case of the OAK OT95C71 circuit mentioned above.

Applicant has discovered that (i) a virtual 1:1 image stream inside a scalable compression expansion processor chip represented logically as a series of run length codes instead of physically as a fully decoded bit stream, and (ii) direct computation of the required output bit streams from this internal run length representation solves the problems of the CCITT compression expansion processor design. Specifically, the time wasted generating and discarding clipped pixels is eliminated. The input parsing function does not have to recompute the previous line's run lengths. Individual color run lengths are retained throughout the clipping and scaling processes, making grey level correction techniques easier to apply. These techniques attempt to reduce edge definition problems commonly encountered during high image reduction ratios by reencoding bi-level, half tone bits destroyed during the reduction process into grey level (analog) output levels, or preserving one of the destroyed color runs by merging it into the first pixel of the following color run. In addition, pipeline buffers can be inserted at optimum positions to maximize overall throughput.

The throughput issue is best understood by observing that the input and output data streams can have widely varying data rates. An output image stream directed at a video display, for example, usually contains substantially fewer pixels than the original image, regardless of whether an image enlargement or image reduction operation is being performed, since the actual display resolution is lower than the original 1:1 source image.

The data rates through the clipping and scaling functions will vary dramatically from those in the compressed and decompressed functions, which themselves vary widely depending upon the actual encoded run lengths. Clipping requires the elimination of virtual input pixels, image reduction requires the elimination of output pixels, and image enlargement requires the generation of extra output pixels. The first two processes favor a faster input stream than output stream, and the latter favors the opposite. It is for this reason that Applicant decouples the input parsing function, which is dependent upon the input data stream, from the output data stream, which is dependent upon the clipping, scaling or rotation parameters.

Figure 1:
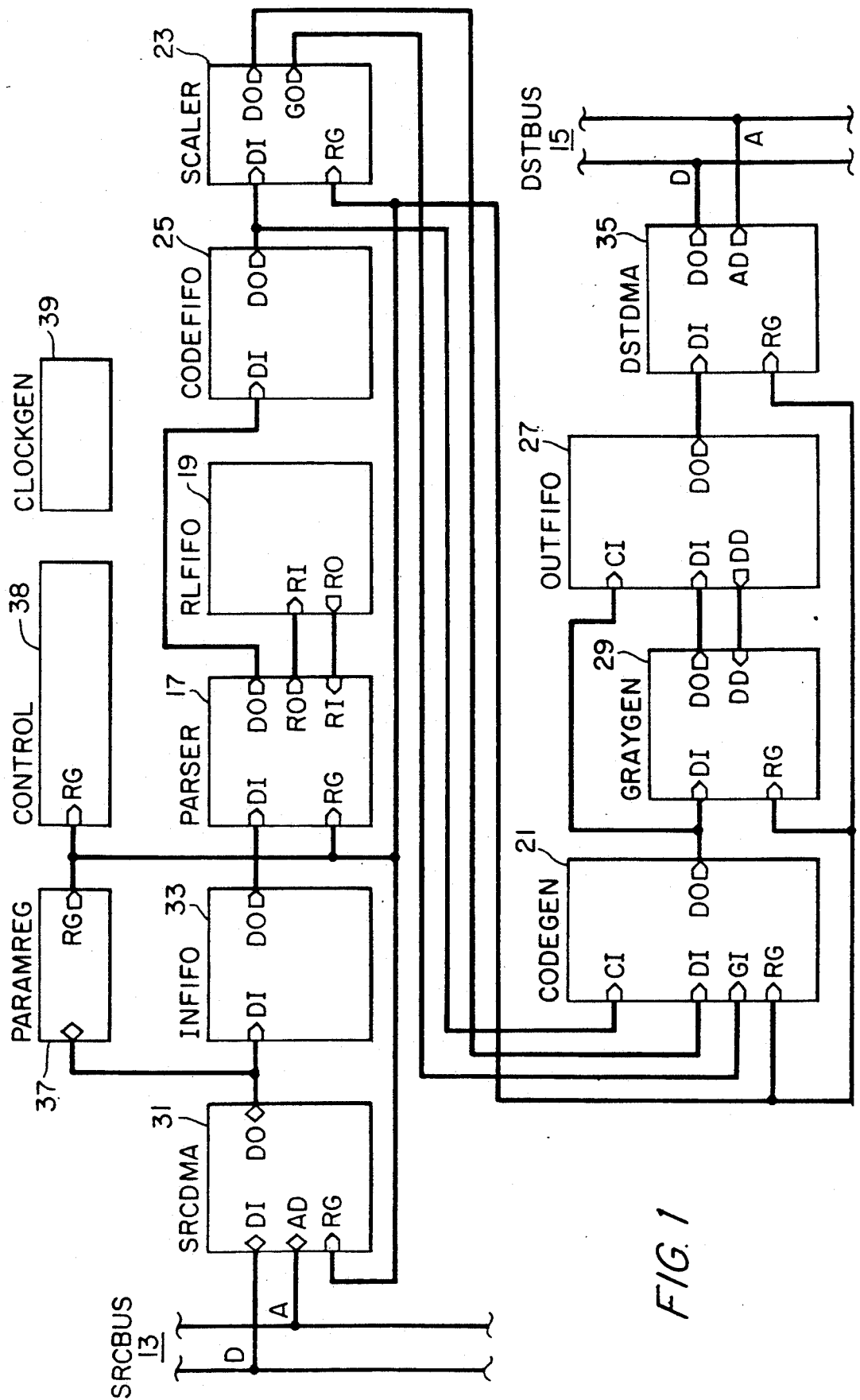
FIG. 1 is a functional block diagram of a VLSI scalable compression expansion processor chip apparatus embodying the present invention.

For purposes of illustration and not limitation, FIG. 1 illustrates a functional block diagram of one embodiment of the present invention. It is understood that each of the components of the FIG. 1 embodiment may be implemented in software, hardware or a combination thereof. At any rate, the functional design of the present invention is as follows.

During image decompression, the present invention processor apparatus 11 accepts 16 bit CCITT encoded data, representing alternating white and black picture element (pel) runs, from a Source Bus (SRCBUS) 13 and decodes this data into a full 1:1 internal representation of the original source raster image stream. Clipping, windowing and scaling functions are then applied to this internal image representation and the resulting output raster image data is delivered to the 16 bit Destination Bus (DSTBUS) 15. The bus widths of 16 bits are employed in a preferred embodiment for compatibility with the largest possible number of existing bus designs and also to keep the overall pin count and lead frame size as small as possible.

During image compression, the present invention processor apparatus 11 receives input image data on the SRCBUS 13, and encodes this data into the variable run lengths defined by the CCITT specifications, and outputs the encoded data onto the DSTBUS 15.

Internal clocking and timing logic is provided by block CLOCKGEN 39. And control logic distributed amongst and between all blocks is schematically represented by block CONTROL 38. In more particular terms, the functionability of the blocks of the processor apparatus 11 in FIG. 1 are as follows.

A PARSER block 17 shown in FIG. 1 encodes pel run lengths, or the CCITT codes representing them, into special Internal Run Length (IRL) codes, and buffers these codes, along with additional codes representing clipping and scaling parameters, in the Run Length FIFO buffer (RLFIFO) 19. Note that the PARSER 17 requires a representation of both the current image or code line and the previous image line in order to support CCITT Group 3 and Group 4 coding methods. The internal RLFIFO buffer 19 must therefore be sufficiently sized to hold a minimum of one scan line worse case.

The PARSER 17 generates and outputs coded instructions to the CODEGEN 21 and SCALER 23 functions. These instructions are held in buffer CODEFIFO 25 and represent actual (unscaled) colored Pel Run Length (PRL) codes during image expansion, and PRL codes enhanced with internal versions of CCITT encoding commands during image compression.

During image compression, the CODEGEN 21 converts the PARSER 17 commands obtained from CODEFIFO 25 into the actual variable run length CCITT color codes. These codes are buffered in a section of OUTFIFO buffer 27 and then output directly to DSTBUS 15.

During image expansion, the PARSER 17 uses special Start of Window (SOW) codes, previously embedded in RLFIFO 19, to locate the left edge of a desired viewing window within the 1:1 (virtual) internal image stream being recreated from the CCITT color run length codes. This clipping operation is performed by not outputting any PRL (pel run length) codes to the CODEFIFO buffer 25 and SCALER 23 until the image stream reaches the start of window SOW code. Any surplus run length from the input internal run length (IRL) code straddling the start of window, and all subsequent IRL codes within the current window, are then converted into PRL codes, buffered by CODEFIFO 25, and ultimately passed to the SCALER 23 where they are modified to produce new PRL codes representing the desired scaled output. This windowing operation continues until the right edge of the specified output window, defined by the presence of an End of Window (EOW) code, is encountered, whereupon the PARSER 17 reverts back to its clipping mode. Additional special IRL (internal run length) codes define an End of Line (EOL) and Start of Line (SOL) condition. The RLFIFO buffer 19 code region between EOL and SOL is used to define Y axis Start of Window and End of Window (SOW and EOW) regions. Appropriate scaling codes, immediately following each SOW code, contain specific instructions needed by the SCALER 23 and GRAYGEN 29 to start each window at the correct pixel within a given scaling run length interval.

The SCALER 23 must convert IRL codes, obtained from CODEFIFO 25, into scaled output run length codes, in such a manner that the resulting clipped output image stream exactly matches an unclipped image stream appearing at the same point in the input stream, independently of how the clipping parameters are selected. Only then can the scaled output be used to fill in a randomly selected repaint region. The SCALER 23 procedure, described below, produces this required output.

Positive (scaled) pel run length codes from the SCALER 23 are converted into pure (CCITT) color output pel runs in the CODEGEN 21. Negative scaled PRL codes represent lost color runs and are accumulated by the SCALER 23 and used to convert the first pel of the next sequential color run into a gray color code.

Scaling must be performed two dimensionally, and this creates a requirement to buffer discarded output lines during image reduction operations. The OUTFIFO buffer 27 provides this (multiple line) buffering capability via its delayed data (DD) path. A GRAYGEN 29 converts buffered Y axis lines into a final output gray level which is then buffered in a separate region of OUTFIFO buffer 27 pending ultimate output onto the DSTBUS 15.

The following provides a detailed description of each principal functional block in FIG. 1. In particular, the PARSER 17, SCALER 23, and, to a lesser extent, the GRAYGEN 29, are covered in greater detail, as are the IRL and PRL code representations and the sizing of buffers RLFIFO 19 and OUTFIFO 27.

In the discussions which follow, individual data path element names ending in a number refer to the data path width of that element. The default is 16 bits and may not be numbered. Most ADDER or ALU (arithmetic logic unit) type data path components are identified by their input data path width. Often, the carry or borrow produced by these components is used for state control and does not directly enter the data path. Unnumbered ADDER or ALU components used as pointers are 4 bits wide by default.

All bus descriptions are labeled 0−N with 0 being the least significant bit. Most code values are used to represent a number as N−1, for example, the code values 0 through 7 would represent the numbers 1 through 8. Any exceptions to these general rules are identified. When such codes are used in addition operations, an input carry is usually forced to generate the correct addition. The elimination of this carry during addition effectively subtracts unity from the result.

Returning to FIG. 1, the block marked SRCDMA 31 is an input DMA channel responsible for all SRCBUS 13 I/O control, including access to the chip control parameter register file (PARAMREG) 37, and for fetching the source image data or source CCITT code runs from the memory system connected to SRCBUS 13. SRCDMA fetches input (16 bits) words according to several user programmable direct memory access (DMA) methods (e.g., Burst Mode, Single Cycle, etc.) and stores them in the input FIFO buffer (INFIFO) 33. From this buffer 33, words are then supplied on demand to the PARSER 17. Overall DMA operation is determined by appropriate register entries within the PARAMREG register file 37. Additional, window specific, DMA parameters may be stored in buffer RLFIFO 19 following each Start of Window (SOW) code as discussed later. The SRCDMA 31 and DSTDMA 35 functions contain (a) an address register that can address the appropriate bus in word increments, (b) means to load and increment that register, (c) means to generate various memory bus cycles including read, write, and read-modify-write cycles, and (d) generic bus control state logic.

Figure 2:
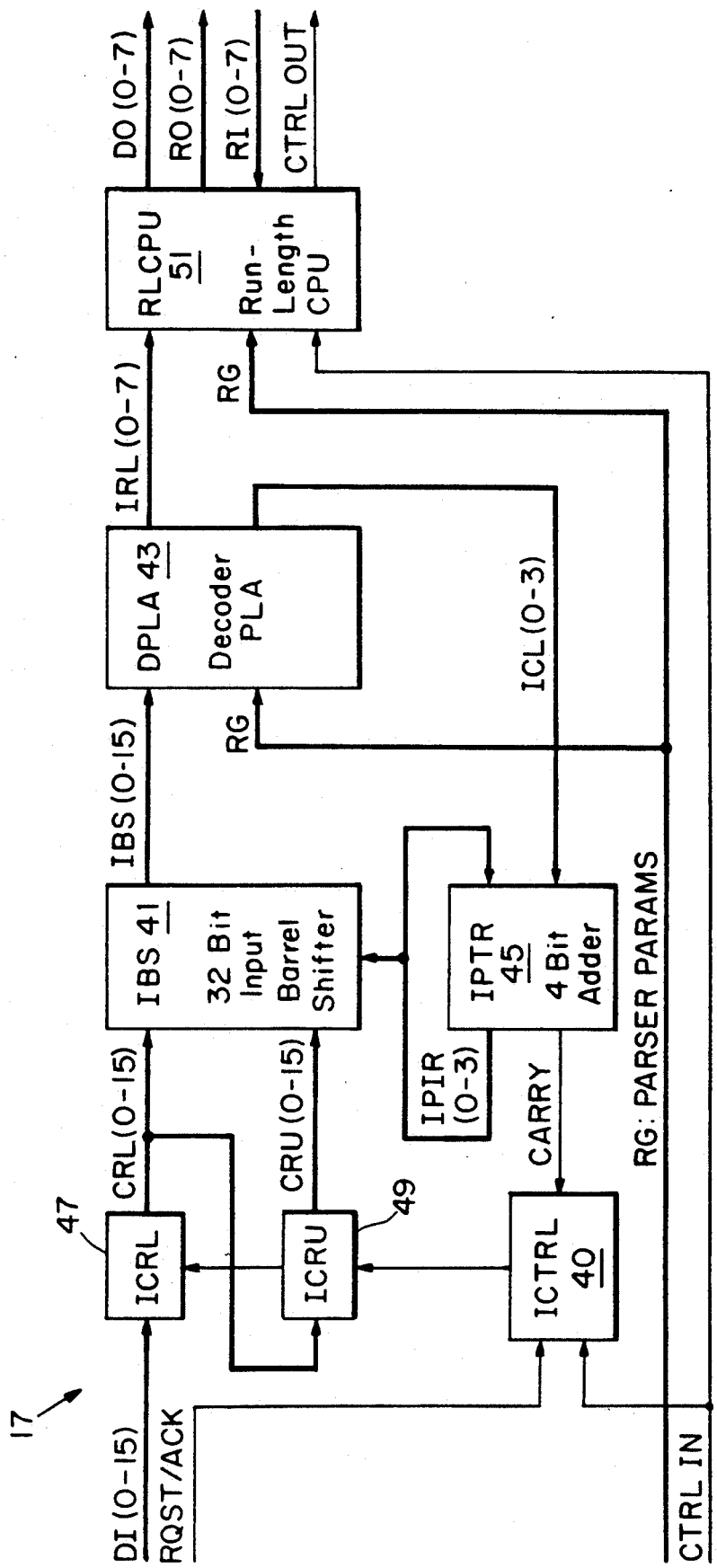
FIG. 2 is a block diagram of the parser employed in the embodiment of FIG. 1.

Referring to FIG. 2, two 16 bit input code registers ICRL (lower) 47 and ICRU (upper) 49 store input data received from INFIFO 33 (FIG. 1). An input code positional control and FIFO handshake is provided by ICTRL 40. Generally an input barrel shifter (IBS) 41 selects a 16 bit field within the 32 bit code register pair 47, 49. A decode PLA (DPLA) 43 decodes input CCITT codes or color run lengths into internal run length codes and input code length. A pointer IPTR 45 provides an indication of the next code in the IBS 41 to be processed. A run length computer (RLCPU) 51 accumulates incremental color run lengths and outputs actual color run lengths or CCITT coding commands. The foregoing is accomplished by the PARSER 17 as described in detail next.

During image expansion, the PARSER 17 conceptually decodes the input CCITT codes, which vary in length from 1 to 13 bits, into an 8 bit Internal Run Length code, IRL[0–7], explained below, and a 4 bit input code length ICL[0–3]. During image compression, the PARSER 17 is used to detect input image pel run lengths from 1–16 bits in length. Since both input codes and input image run lengths vary in length, a subfield of 16 bits is selected from an input field of 32 bits (two consecutive words) by Input Barrel Shifter (IBS) 41. As each code is decoded, Decode PLA (DPLA) 43 provides an output to shift the IBS 41 to the start of the next code. This requires the 4-bit adder, IPTR 45 which points to an indication of the next code. Overflows from the ALU require another word to be input, and the two words in the lower and upper input code registers (ICRL, ICRU) 47, 49 must be shifted by one word to adjust for the new IBS 41 shift code (the IPTR 45 remainder). The data input scheme shown in FIG. 2 appears in several patents (see U.S. Pat. Nos. 4,807,043 and 4,839,738) and is substantially identical to the method used in the above mentioned OAK OT95C71 circuit except for the format of the emitted output IRL codes. The Run Length Computer (RLCPU) 51 will be discussed below.

The DPLA 43 output is packed into fixed length 4 bit or 8 bit codes by the Run Length FIFO (RLFIFO) 19 input/output circuitry, and represent either actual pel color run lengths or special control codes. The IRL codes are described in Table 1 below, but it is important to understand the run length buffer concept first.

Applicant converts both encoded CCITT data and original image data into a series of codes representing the number of consecutive pixels of the same color. Having done so, Applicant can then mathematically operate upon these codes without the need to reconvert the previous scan line back into run lengths, as is currently done in the references cited above and below. This is desirable because the present invention apparatus may be clipping the original data (discarding pixels) and does not want to waste bandwidth doing this at a maximum of 16 bits per cycle, which is the fastest that current schemes operate. The run lengths provide sufficient information to either encode or decode images using the CCITT one and two dimensional schemes. (See, for example, the flow charts shown in U.S. Pat. No. 4,562,484).

Looking at the problem another way, current designs such as the OAK OT95C71 immediately convert (logical) run lengths, representing the full 1:1 image, into (physical) 1:1 bit streams. But the scaling operation must then convert these 1:1 bit streams into another (scaled) bit stream. This can be done bit serially or the incoming bit stream can be processed in parallel. If, however, some form of gray conversion or similar image enhancement function is desired, the original color runs must be recovered. In the present invention design, Applicant maintains the internal color run length information and converts this information into a modified run length prior to the final output bit stream conversion operation. In either case, the original color run lengths must be recovered in order to correctly perform CCITT encoding.

The required size of buffer RLFIFO 19 is discussed next. Applicant has chosen to represent the image as fixed length codes, but employs a method to get the code efficiency high enough to be competitive with the 1 bit per pixel coding scheme commonly used in the prior art. In Table 1, run lengths from 1 to 8 bits are packed into 4 bit codes, and two 8 bit codes are defined, one for runs from 9 through 64 pixels and the other for codes representing multiples of 64 bits. Within these two latter groups, certain otherwise redundant or illegal codes are used for special purposes, such as defining the two-dimensional escape codes (P, VL3 through VR3, H, X, and EOL), a zero run length control code, and a set of window and line control flags.

The coding scheme of Table 1 requires that codes stored or fetched from RLFIFO buffer 19 be handled on 4 bit boundaries, adding some extra multiplexing and demultiplexing logic to the input and output of RLFIFO 19, but the scheme reduces the worst case memory requirement to approximately four times the one pixel scheme (Applicant requires at worst 4 bits to represent a run of 1 pel). In real situations, most run lengths exceed 1 pel, and once the average run length exceeds 4 pels, this scheme will use less memory, and less memory bandwidth, than the single bit per pel scheme of prior art. A 1K×8b RLFIFO memory 19, the same size provided in the OAK OT95C71, can handle 2K 1 bit pel runs, enough to support most facsimile applications (which need either 1728 or 2048 pels). This memory size will also support most engineering drawing applications, which feature large sheet sizes containing a relatively high percentage of white space. The governing factor is the average number of run lengths, not the absolute resolution in dpi. Thus, for most applications, the conversion of the main reference memory from 1 pel per bit to incremental run lengths does not produce an unreasonable memory penalty. By implementing the extended mode defined in the current CCITT Group 4 specification, where the data represents individual pels, one can even handle the situation where compressed half-tones or other short run bit pattern images might otherwise create more output data than the original source image.

In Table 2, the following indications are interpreted as:

c=color;
0=white;
1=black.

TABLE 1

| Internal Run Length Code Assignments | | | | | | | | |
|---|---|---|---|---|---|---|---|---|
| Description/Bit: | 7 | 6 | 5 | 4 | 3 | 2 | 1 | 0 |
| Packed into 4 bits: | | | | | | | | |
| RL=XXX+1 (XXX=0 to 7) | 0 | 0 | 0 | 0 | 0 | X | X | X |
| Packed into 8 bits: | | | | | | | | |
| RL=(64)*(XXXXX+1) (XXXXX=0 to 39) | 1 | 1 | X | X | X | X | X | X |
| SOL code | 1 | 1 | 1 | 0 | 1 | 0 | 0 | 0 |
| SOW code XXX (1 to 7) | 1 | 1 | 1 | 0 | 1 | X | X | X |
| EOL code | 1 | 1 | 1 | 1 | 0 | 0 | 0 | 0 |
| EOW code XXX (1 to 7) | 1 | 1 | 1 | 1 | 0 | X | X | X |
| ESC code XXX (0 to 4) | 1 | 1 | 1 | 1 | 1 | X | X | X |
| VL codes XX (3 to 1) | 1 | 1 | 1 | 1 | 1 | 1 | X | X |

TABLE 1-continued

| Internal Run Length Code Assignments | | | | | | | | |
|---|---|---|---|---|---|---|---|---|
| Description/Bit: | 7 | 6 | 5 | 4 | 3 | 2 | 1 | 0 |
| V0 code | 1 | 0 | 0 | 0 | 0 | 0 | 0 | 0 |
| VR codes XX (1 to 3) | 1 | 0 | 0 | 0 | 0 | 0 | X | X |
| RL=0 | 1 | 0 | 0 | 0 | 0 | 1 | 0 | 0 |
| P code | 1 | 0 | 0 | 0 | 0 | 1 | 0 | 1 |
| H code | 1 | 0 | 0 | 0 | 0 | 1 | 1 | 1 |
| X code | 1 | 0 | 0 | 0 | 0 | 1 | 1 | 1 |
| RL=XXXXXX+1 (8 to 63) | 1 | 0 | X | X | X | X | X | X |

TABLE 2

| Pel Run Length Code Assignments | | | | | | | | |
|---|---|---|---|---|---|---|---|---|
| Description/Bit | 7 | 6 | 5 | 4 | 3 | 2 | 1 | 0 |
| RL=(64)*(XXXXX+1) (XXXXX=0 to 39) | C | 1 | X | X | X | X | X | X |
| SOL code | C | 1 | 1 | 0 | 1 | 0 | 0 | 0 |
| SOW code XXX (1 to 7) | C | 1 | 1 | 0 | 1 | X | X | X |
| EOL code | C | 1 | 1 | 1 | 0 | 0 | 0 | 0 |
| EOW code XXX (1 to 7) | C | 1 | 1 | 1 | 0 | X | X | X |
| RL=XXXXXX+1 (0 to 63) | C | 0 | X | X | X | X | X | X |

Figure 3:
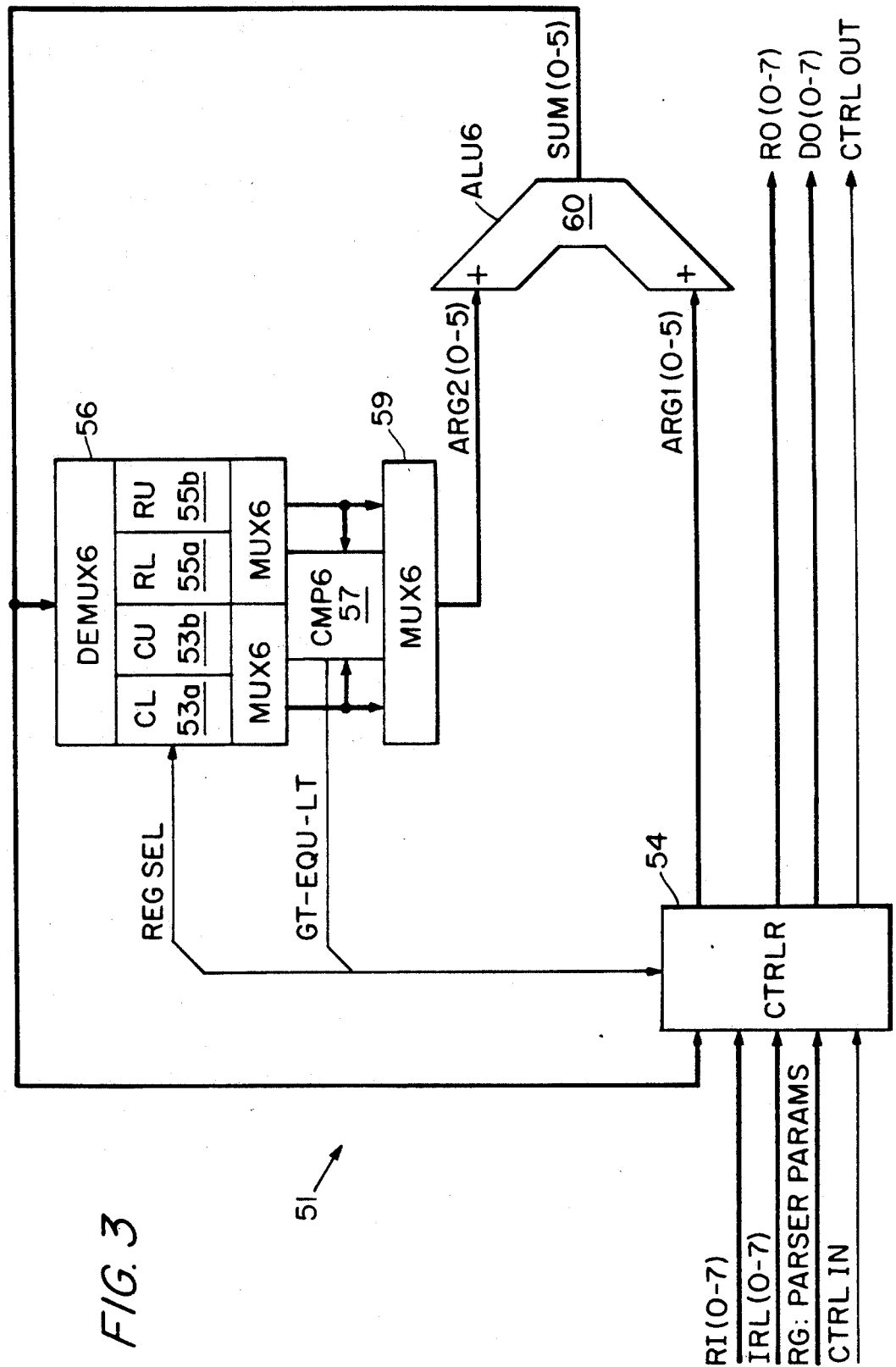
FIG. 3 is a block diagram of run length CPU employed in the parser of FIG. 2.
Figure 8:
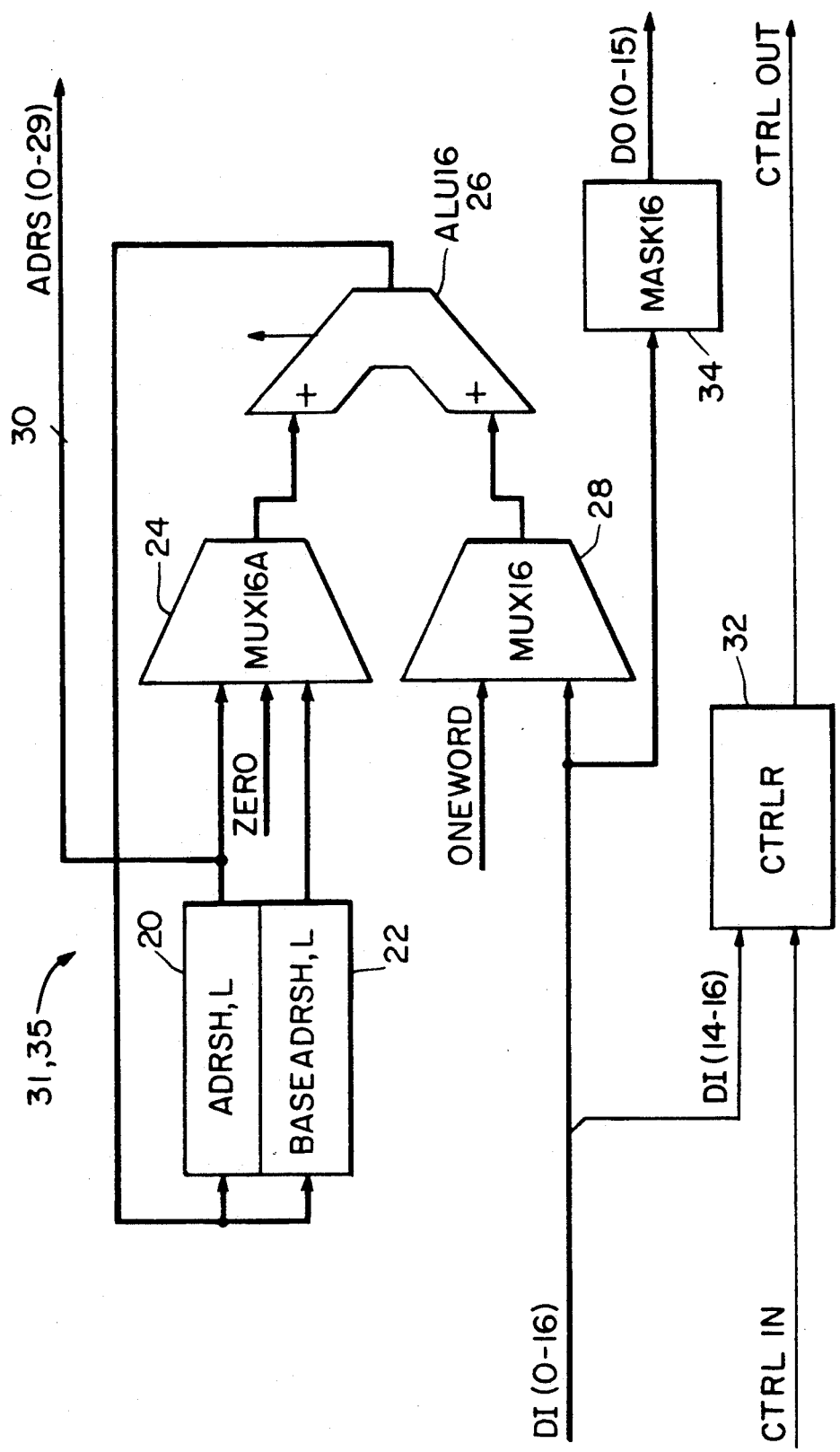
FIG. 8 is a schematic of direct memory access logic and data paths for the FIG. 1 embodiment.

The Run Length Computer (RLCPU) 51 shown in detail in FIG. 3 is the heart of the PARSER 17 decoding engine. It contains the principle data path component shown in FIG. 3 and is responsible for detecting and maintaining color and window state information, and for performing the actual calculations needed to decode or encode color run lengths. Extra working registers may be added and the width of the ALU and registers may be extended if it is later decided to perform the DMA boundary address calculations within RLCPU 51. The current discussion assumes preferably these calculations are performed separately within the DMA controller 32 (FIG. 8). Calculations are performed upon IRL codes modulo 6 bits, since this is the natural format for these codes. This keeps the ALU6 size small and the ALU6 delay below the RLFIFO 19 access time.

The RLCPU 51 recognizes embedded window codes and uses them to switch between the X and Y master states, and to detect active window regions. The Y state spans all RLFIFO codes from EOL to SOL (End of Line to Start to Line). The X state spans from SOL to EOL. The system initializes in the Y state.

While in Y state, and with the processor apparatus 11 programmed to perform a decode operation, the RLCPU 51 reads the current Y line count (in the form of an IRL code), conceptually subtracts unity from this value, and writes it and all remaining Y state codes back into buffer RLFIFO 19. When the code reaches (underflows) 0, the code is discarded and the next (Y line count) code is examined. Y SOW (Start of Window) codes are used to enable identically numbered X SOW codes encountered within the X region of RLFIFO 19. The Y SOW code is then passed on to the CODEGEN 21 (FIG. 1) instead of being returned to RLFIFO 19. Additional control codes following each Y SOW code provide information to the DMA base address register 22 (FIG. 8) and GRAYGEN 29. These codes are removed from RLFIFO buffer 19 and passed downstream to the DMA when the preceding SOW code becomes active. Similarly, Y EOW (End of Window) codes disable identically numbered X EOW codes encountered in the X region of RLFIFO 19 and are likewise passed downstream. This eliminates a separate requirement to have a DMA line length count register, or for the DMA to perform any line length counting operations. Eventually, another Y line count run length code is encountered, and the Y state proceeds to copy it and all remaining Y state codes back into buffer RLFIFO 19.

Upon encountering the SOL code, the RLCPU 51 enters into the X state and performs certain initialization steps, including those defined in the CCITT two dimensional scheme. The initial color is set to white, and various internal pointer-accumulator registers are reset to zero. Previously initialized Y window state information remains valid.

While in the X state, and with the present invention apparatus 11 programmed to perform a decode operation, the RLCPU 51 attempts to decode incoming CCITT codes, such as P, V, and H, as well as SOW (Start of Window), EOW (End of Window) and the EOL (End of Line) codes. It maintains two pointer registers 53, 55, the current line run length, CL-CU, and the reference line pointer, RL-RU. These pointers are used in various ways to create a new output PRL (Pel Run Length) code from the input CCITT code and the previous line values read from RLFIFO buffer 19. An internal version of the computed PRL code, representing a run length segment, is also written back into RLFIFO 19.

Upon encountering a SOW or EOW code, the current color run computation is interrupted and any length accumulated up to the point where the SOW or EOW code was read is then output. The run length is then effectively reset to zero. In this manner, the relative positioning between SOW and EOW codes, in terms of run length sums, remains invariant. As each SOW is encountered, its region code is checked against the currently active Y region(s) previously setup within the Y state. A matching SOW code activates the X state machine to output the SOW code and several of the codes immediately following the SOW code, and then to output all run length codes encountered up to and including the matching region EOW code. The codes following SOW contain state information needed to initialize the scaling and DMA functions. This will be discussed below.

The X state terminates when the EOL code is detected, and the RLCPU 51 then re-enters the Y state. Y and X states continue to alternate until an End of Frame Buffer EOFB (two adjacent EOL codes) is encountered or the Y state terminates (SOL immediately follows EOL). This will happen when all window codes have been processed and all Y run length codes have been consumed.

During CCITT encoding operations, the RLCPU 51 reads buffer RLFIFO 19 to obtain the previous line reference IRL data, and combines this information within its RL-RU register pair 55 a,b. Addition is performed modulo 64, with extra steps added on overflow. This matches the basic CCITT Terminator Code and Makeup Code scheme. Data representing incremental chunks of the current color run (received from DPLA) is summed within the CL-CU register pair 53 a,b. During image encoding, the maximum input incremental run length is the width of the SRCBUS 13, i.e., 16 bits, and RLCPU 51 must sum this until a color break occurs. Notification of a color change causes the RLCPU 51 to compare these two pointer registers 53, 55. The RLCPU 51 then outputs the appropriate H, V, or P codes to CODEFIFO 25 as well as updating the current line run lengths in RLFIFO 19.

It is possible to perform windowing within the encoding operation, but not scaling. No more than one pair of SOW-EOW codes is permitted in order to keep the previous reference line calculations simple. The input image line length and line width is computed using the SOL and EOL code position in exactly the same manner as the decoding operation.

In a preferred embodiment, RLCPU 51 accomplishes the foregoing by employing the following for elements of FIG. 3. Six bit input code line run length accumulators are used for the CL-CU pointer register 53 a, b. Six bit reference line run length code accumulators are used for the RL-RU pointer registers 55 a,b. A 6-bit relative magnitude comparator (CMP6) 57 and a 6 bit 2:1 selector (MUX6) 59 are provided as shown in FIG. 3. The output of selector 59 is received by 6 bit adder (ALU6) 60. A microsequence state machine controller 54 (CTRLR) executes control sequences based upon input data values and parser parameter registers 37 (FIG. 1). A 6 bit 1:4 selector 56 serves as a demultiplexer designated DEMUX6 in FIG. 3.

The RLFIFO buffer 19 (FIG. 1) is initialized by directly programming a line template sequence from the SRCBUS 13. The template specifies all SOW, EOW, SOL and EOL codes and their relative (white) run length codes needed to correctly space them. Additional data, most notably the Scaling Pointer Register (SPR), appears immediately following the SOW and SOL codes. The SPR will be discussed in detail later. This "in-line" access method can be extended to add SRCDMA 31 and DSTDMA 35 register values needed, for example, to calculate the output screen address offset and window lengths, and the mask registers needed to correct the right and left window screen boundaries. Additional instructions directed at the GRAYGEN 29 can be inserted. The basic idea represents a "point of use" programming method, limited only by resource allocation within RLFIFO 19 instead of resource allocation within a limited number of specially addressable registers. The SOW parameters flow downstream to the SCALER 23, CODEGEN 21, GRAYGEN 29 and DSTDMA 35 where they are recognized (by the SOW code preceding them) and either removed for processing or passed to the next stage. This mechanism eliminates synchronization problems in the pipeline and eliminates most feedback paths, saving wires and extra control logic. The main data path and a few handshake control signals, plus a few global state control lines, provide all of the control state information to correctly maintain all downstream pipeline stages. If desired, all DMA calculations except the word incrementation function could be performed within RLCPU 51. Since boundary conditions occur infrequently the extra time needed to handle these exception processes need not add significant delay to the overall data throughput rate.

In effect, the individual line length registers, scaling registers, address offsets, etc. required to support each X and Y window region, which might otherwise be stored in a separate register file and accessed via a separate controller, may all be maintained in the one common RLFIFO 19 memory and managed by the one common RLCPU 51. This architecture saves the cost of allocating area and support circuitry and the necessary compromises needed to support what would otherwise become a predetermined fixed number of window regions. The idea works for decoding, where the SRCBUS 13 is normally linearly addressable and the DSTBUS 15 may contain XY addressable regions, and for encoding, where the addressing modes are normally reversed. The area cost of adding on chip DMA functionality to SRCBUS 13 and DSTBUS 15 can be greatly reduced using this scheme, if one wants to burden the RLCPU 51 with the Start of Window DMA addressing calculations and add the additional temporary result register required, assuming the extra address pads can be afforded.

This method of specifying and controlling the overall processor apparatus 11 functionality is completely flexible, with the only limitation being the 7 regions imposed by the current IRL code assignments. The global functionality of the PARSER 17 and RLCPU 51 is established by programming appropriate parameter and status/control registers within the PARAMREG register file 37.

Moving on from the PARSER 17, the simpler encoding operation is discussed first and then the more complex decoding operation follows thereafter.

Briefly, in a preferred embodiment CLRGEN 79 (FIG. 6) is a Color generation circuit which outputs a masked filled of 1's or 0's with one or more LSB's (least significant bits) encoded for gray code. CLRGEN 79 also multiplies color runs by 1, 2 or 4. The EPLA 61 is preferably a CCITT code generation ROM which outputs CCITT encoded variable run length codes. The multiplexor 78 selects input color run from SCALER 25 (decoded) or EPLA 61 code length output. OPTR 69 is a 4 bit adder which accumulates a pointer to output position of the next code. A multiplexor (MUX13) 81 is a 13 bit data path element which selects EPLA 61 output during encoding. The OBS 63 is a 32 bit output barrel shifter which shifts input code to the next output position such that zeros are rotated to all positions outside the code field. OR32, is a 32 bit merger selector 65 which OR's the next OBS 63 output with the previous output code registers 67 output. Output code registers 67 a and b are two 16 bit output code registers concatenated into one 32 bit register. The lower 16 bits ultimately are output on the output data bus denoted DO in FIG. 6. The controller (CTRLR) 80 is a simple state machine which handles I/O handshakes, controls OPTR 69, and handles generation of multibit gray codes.

During image compression, the Code Generator CODEGEN block 21 (FIG. 1) converts the PARSER 17 generated P, V, H, H, and Group 3 commands, buffered in CODEFIFO 25, into the CCITT specified run length codes, and outputs these codes to the Output FIFO (OUTFIFO) Buffer 27. In Group 3 mode, the PRL (pel run length) codes are used directly. In Group 4 or Group 3-2D modes, the P (Pass), V (Vertical) and H (Horizontal) commands encode directly into one word, with the H command then producing two Group 3 type codes directly from the PRL codes. The X (extended) mode is a single code word which is then followed by the PRL codes which essentially represent direct output pixel patterns. This state persists until one of the ESC codes is encountered.

The CODEGEN 21 (FIG. 6) uses an Encoding PLA (EPLA) 61, a 32 bit Output Barrel Shifter (OBS) 63, a 32 bit merging selector (OR32) 65, two 16 bit Output Code Registers (OCRL 67a and OCRU 67b) and a 4 bit Adder (OPTR) 69 to assemble the variable length output codes created by EPLA 61 into 16 bit words. In operation, the output code registers 67 a, b are initially set to all '0's and then output codes of various lengths are shifted to a bit position pointed at by OPTR 69 and OR'ed with the current 32 bit register 67 contents. The EPLA 61 outputs an output code length (OCL) which is then added to the OPTR 69 to set up the OBS 63 to shift the resulting EPLA 61 code to the next bit position. The process repeats until the OPTR 69 overflows, resulting in OCRL 67a being output to OUTFIFO buffer 27 (FIG. 1), OCRU 67b shifting down to OCRL 67a, and OCRU 67b then being reset to all '0's. In this manner, the complete output bit stream is constructed using the EPLA 61 code and run length outputs. This bit assembly operation is, in effect, the inverse of the bit disassembly operation described above. It is important to note, however, that EPT 61 is implemented in such a manner that very little extra state information is required and the overall control logic associated with CODEGEN 21 is minimal.

The largest CCITT code length is 13 bits. This sets the minimum number of EPLA 61 outputs at 17 bits if special circuitry is used to force '0's into the 3 most significant bits feeding the OBS 63 while the apparatus 11 is executing an encoding sequence. Jumping ahead a little, the CODEGEN 21 accepts commands from the SCALER 23 to create a maximum of 16 pels per request while executing a decoding sequence. The SCALER 23 output is the OCL code on line 62 (FIG. 6), and MUX4 (multiplexor 78) provides the path into OPTR 69. The Color Generator circuitry 79, CLRGEN, is capable of generating an output of all '0's during encoding sequences. The CLRGEN 79 will be discussed in more detail following the SCALER 23 discussion below.

Before discussing the scaling operation below (FIG. 4), it is necessary to consider the present invention clipping, windowing, and scaling operational requirements in more detail.

The scaling function must accept input (incremental) pel run lengths of varying size and covert them into scaled output pel run lengths in such a manner that it is possible to precisely specify the output scaled run length pattern at any point within the overall input run length pattern, without regard to the total number of (1:1) pixels discarded from (clipped out of) the input stream prior to being presented to the SCALER 23. Furthermore, the scaling function must be "fair", that is, it must produce the minimum distortion in the scaled run lengths in order to best preserve the input image aspect ratio and edge features. This latter requirement translates into duplicating or deleting picture elements evenly (smoothly) over what is herein referred to as a Repeating Run Length Interval (RRLI). Since it is assumed for the moment that only integral pixels can be specified, this requirement must be approximated whenever there is an N/M ratio, such as 4/7, that produces an irrational fraction. In other words, one could represent 4/7 by always deleting pixels 3, 5 and 7 out of a repeating pattern numbered from 1 to 7. This will result in the four pixels numbered 1, 2, 4, and 6 being output for each and every run of 7 input pixels. Or, if one is expanding an image with a scale factor of 11/7, one can duplicate pixels 1, 2, 4, and 6 resulting in an output stream of 1, 1, 2, 2, 3, 4, 4, 5, 6, 6, 7, which contains the necessary 11 output pixels for each 7 input pixels. Applicant concludes that:

1. the input stream repeats in intervals of M, and
2. the output stream repeats in intervals of N, and
3 $K = |N-M|$ pixels are deleted or added between the input and output streams.

The present invention requirement for exact pixel stream reproducibility can be met if N and M are used in operations involving only integers, and all algorithms based upon the irrational fraction N/M are avoided.

Furthermore, the present invention apparatus needs to pick up the output pixel stream at any point downstream, so it makes sense to have a predetermined input pixel scaling template which matches and tracks the input 1:1 pixel stream and then "slides" this template so it corresponds to the exact pixel position within a given RRLI corresponding to the point where the viewing window begins. As each input run length of length R is presented to the present invention scaling function, the template is slid the corresponding distance, much in the same manner that a tailor might measure an inseam with a tape measure that was too short to span the entire length. The initial starting position within the present invention template, corresponding to the SOW condition, will become the Scaling Pointer Register 71 (SPTR) of FIG. 4 and will need to be available to match the template correctly at this boundary condition.

One could build a SCALER function by using a ROM with an input for the current code run length and another for the current offset within the template. The output would then be the desired scaled run length. This might require a ROM with, say, two 4-bit input fields and one 5-bit output field assuming that N and M are limited to a range from 1 to 16 encoded as 0 through 15.

The ROM scheme would limit the present invention to only one precomputed scale factor. One would need to use a RAM to dynamically store the constants for each new N/M scale factor, and this requires at a minimum $256 \times 5 = 1.25K$ bits of SRAM, plus the means to load and read it from either SRCBUS 13 or DSTBUS 15. The present invention must access this memory once for each scaling operation, but the access time of this relatively small memory probably won't be awful. The memory is equivalent to 40 double word registers, and requires roughly $2K\lambda^2 bit \times 1.25K$ bits $= 2.5$ Mz, one seventh the amount needed by RLFIFO 19. If the Y axis scaling is performed in a similar manner, and uses a separate scale factor from X, these numbers will need to be doubled.

Applicant has thought of another way to perform scaling which is competitive in area and speed, and requires less than 40 bits of programming per dimension. In this scheme (FIG. 4), a 32 bit Scale Template Register (STR) 73 holds an alternating pattern of '1's and '0's representing the desired scale factor, constructed according to the following rules:
1. A reduction template (N/M, N < = M) contains as many repeating S = M bits sequences as will fit into 32 bits, with '1's corresponding to deleted bits and '0's corresponding to copied bits.
2. An expansion template (N/M, N > M) contains as many S = N bit sequences as will fit into 32 bits, with '0's corresponding to duplicated bits and '1's corresponding to copied bits. A bit is duplicated by repeating the previous copied bit, so the template must begin with a '1'.

In both cases, the '1's and '0's are evenly distributed within the S bit interval. Conceptually, this represents our quantized smoothing function. By choosing to represent N/M it in this way, Applicant has achieved the first objective of complete reproducibility, since essentially he has defined what action is going to be performed on a bit by bit basis, provided STR 73 is applied to the input 1:1 pixel stream in the correct manner. The output stream N repeats in an exact pattern so that M input bits produce N output bits. Each complete M bit input sequence advances the STR 73 by exactly S bits. Applicant handles the situation following an arbitrary clipping window by dividing the total number of input pixels clipped by M. The remainder then represents either the total number of STR bits (reduction) or the total number of STR '1's (enlargement) which have been consumed within the STR 73 at the point where the output window begins. Scaler 23 then sets a 4 bit address reference to Scaling Pointer Register SPTR 71 to point at the next bit or the next '1' following this calculated position. That is adder (SPTR) 71 is used to point at the least significant bit (LSB) of 16 bit STR field.

The STR 73 is preferably a user programmable 32 bit register. It must be programmed once with the template data described above each time an image scale factor is initialized. A second 3 bit programmable register, the Template Correction Register (TCR) 75, is also required. The TCR 75 contains a 3 bit value representing the difference between a Repeating Run Length Interval (RRLI) and the number 16. The RRLI is computed by dividing 16 by the nearest whole multiple of S. In the 4/7 example, S = 7, RRLI = 14 and TCR = 2. In the 11/7 example, S = 11, RRLI = 11, and TCR = 5. The worst case (smallest RRLI) occurs when S = 9 and TCR = 7. The TCR 75 is an artifact of having selected a maximum RRLI limited to 16. The scaling theory presented here is not limited to RRLI = 16 and can, in principal, be extended to any desired RRLI and S.

Figure 4:
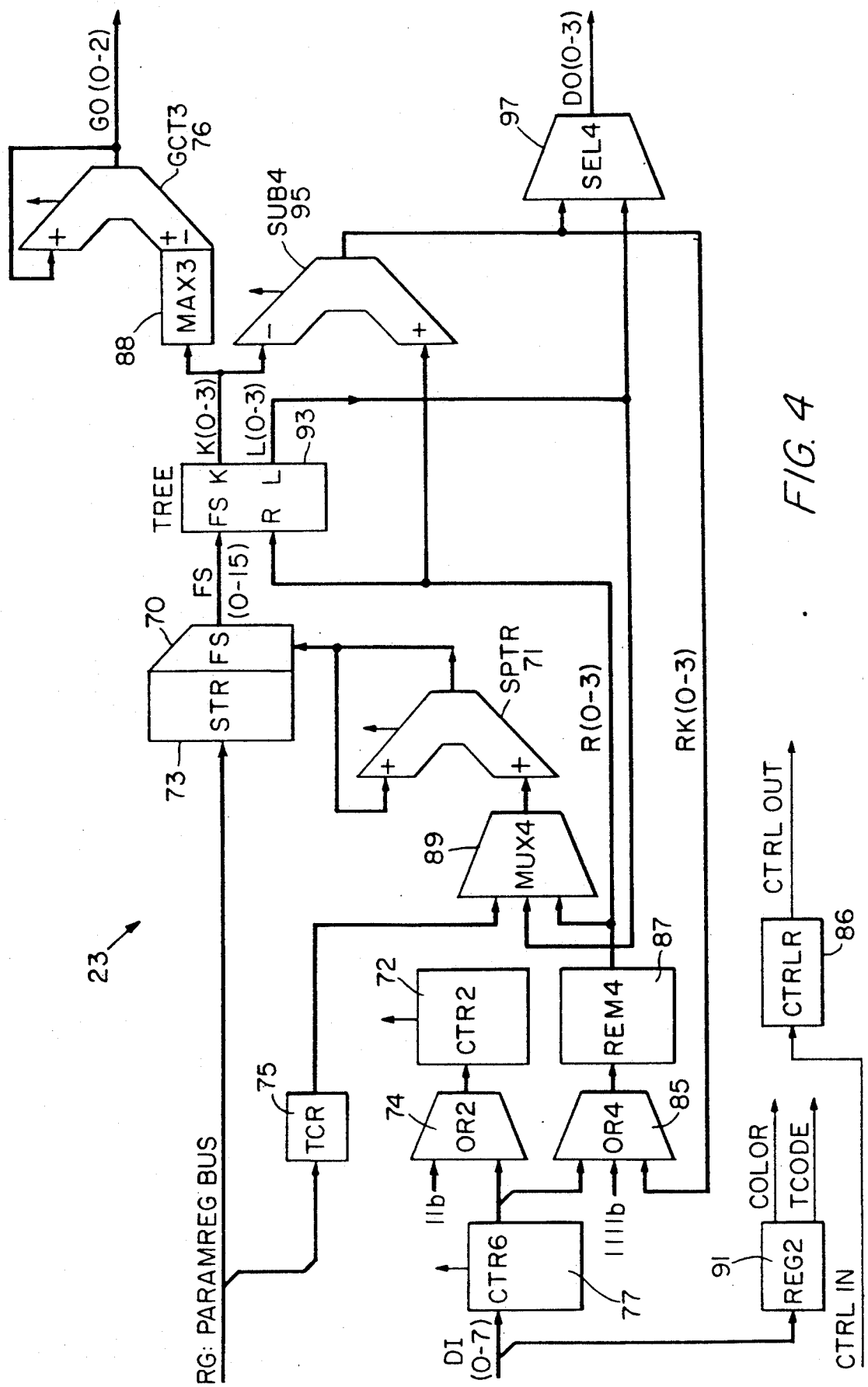
FIG. 4 is a block diagram of a scaler employed in the embodiment of FIG. 1.

The SCALER 23 operation can now be explained in detail with reference to FIG. 4. The SCALER 23 fetches 8 bit Pel Run Length (PRL) codes from the CODEFIFO 25. The two bits within each code establishing the color and code format are loaded in REG2 which is a 2 bit state register. And the 6 bits generally containing pel run length information are loaded in CTR6 a 6 bit decrementing counter with underflow flag. There are two code formats and two colors.

The MakeUp (MU) code format represents increments of N*64 pels, with codes C1000000 through C1100111 representing the values N = 1 through N = 40 inclusive. For example, the code C1000001 represents 128 pels of color C. Codes C1101000 through C1111111 represent SOW codes, EOW codes, and various other special codes identified in Table 2.

The Terminator Count (TC) code format uses the codes C0000000 through C0111111 to represent pel runs from 1 to 64 inclusive. There is no zero pel run—the CCITT "0" run length code is used to control color state only. The PARSER 17 handles this exception condition without generating any PRL codes. For example, C0001111 represents a 16 pel run of color C.

A scaling operation begins with a SOW code (C1101XXX). This code is copied into CODEGEN 21 and simultaneously activates the SCALER 23, which resets the SPTR 71 adder (to zero) and sets up the data paths to add the PRL code into SPTR 71 via CTR6 77, OR4 85, REM4 87, and MUX4 89. Preferably, OR4 is a 3 way 4 bit selector 85, REM4 is a 4 bit run length reminder register 87 which is the source of the R bus. MUX4 is preferably a 3 way 4 bit selector 89.

This, in effect, loads SPTR 71 with this (first) code, which represents an offset into the STR 73 corresponding to the current SOW code. The next several PRL codes may represent DMA parameters such as the SOW mask and the DMA X offset from the current SOL pointer. These codes are copied into CODEGEN 21 without further SCALER 23 action. The SCALER 23 then fetches the first active PRL code, which, like all PRL codes, is loaded into REG2 91 and CTR6 77.

Let's assume this is a TC terminator code, that we are doing a reduction operation, and that this code is less than 16 pels. REM4 87 receives and passes the lower 4 bits of this code to MUX4 89. MUX4 89 is used to select a value to be added to the previous value of SPTR 71 at the end of the current cycle. REM4 87 represents the (remaining) length of the current pel run. This data, shown as R in the drawing, is fed to the TREE 93 and SUB4 block 95, where it is combined with the TREE 93 output K to produce a scaled result RK which is passed on to the CODEGEN 21 via the SEL4 circuit 97. Preferably, the SEL4 is a 2 way 4 bit selector 97, and TREE circuit 93 is a 16 bit selection network that outputs a K count, (i.e., the number of 1's in a widowed STR field of R or finds a windowed STR field length L containing R 1's.

This is accomplished as follows. The SPTR 71 causes the 32 bit Funnel Shifter FS (½ of a Barrel Shifter) 70 to select a 16 bit field within the previously initialized 32 bit Scaling Template Register (STR) 73. SPTR 71 selects the least significant bit of this field. In this manner, the TREE circuit 93 receives STR 73 bits SPTR through SPTR+16. These bits represent the scaling pattern. TREE circuit 93 sums the of '1's within the first R bits of this 16 bit input field, and produces a 4 bit output K representing this binary encoded sum. K can vary from 0 to 16 and, unlike most other codes, represents the values 0 through 16. The 16th state is handled as an exception and will be described later.

K represents the number of bits deleted from the output stream and is subtracted from R to produce the scaled output, RK, during image reduction scaling operations. It turns out that TREE circuit 93 cannot produce the number 16 during reduction scaling, since a 16:1 reduction implies deletion of 15 bits and not 16, and the subtractor SUB4 95 therefore does not need to handle the subtraction of numbers exceeding 15. SUB4 is preferably a 4 bit subtractor with output borrow flag.

By way of example, and not limitation, using a scale factor of 4/7, an STR 73 pattern of .0010101001010100-1010100101010010b which has a 14 bit RRLI results. Assuming a clip window of 25 pixels, 25/7 leaves a remainder of 4. The initial SPTR value (in SPTR 71), stored immediately following the SOW code, is therefore 0011b. The SPTR 71 adder always adds an extra '1' to the input from MUX4 89 to compensate for the fact that PRL codes 0 through 15 really represent the values 1 through 16, etc. This operation is performed by forcing the input carry into the Sb (least significant bit) stage to always be high. Assuming the first run length within the window is 9 pixels long, an initial R value will be 1000b. The FS 70 will pass STR 73 bits 4 through 20 to TREE circuit 93, which then selects bits 0 through 8 and counts the number of '1"s within this field. In this example, SCALER 23 has selected 101001010 and the output, K, will equal 4. Subtracting K=4 from R=8 yields the answer RK=4, which represents a run of 5 pels. This must equal the number of copied bits, which can be seen by the number of '0"s in the selected STR 73 field, is indeed 5 pels.

Having completed scaling the current code length R, SPTR 71 must be advanced to match the next STR 73 starting bit by adding R to its current position. Whenever SPTR 71 overflows 16 bits, the Template Correction Register (TCR) 75 value is added to SPTR 71 to correctly realign SPTR 71. This corrects for the fact that many RRLIs do not fit into exactly 16 bits.

The SCALER 23 is now ready to read in a new value into REM4 87 for this or the next color and repeat the above cycles.

The above steps are modified slightly for TC (terminator codes) exceeding 16 bits. These longer codes are identified by the fact that bit 4 or bit 5 of the TC code is a '1'. In this case, the upper two bits of CTR6 77 are copied into CTR2 72 via OR2 74 and the value 1111b is forced into REM4 87 through OR4 85. This value, which represents 16 bits, is then processed as above, and when it is consumed, CTR2 72 is decremented. The process repeats until CTR2 72 underflows, at which point OR4 85 switches to the lower 4 bits of 77. And everything proceeds as in the case when the code length is less than 16.

In the preferred embodiment CTR2 is a 2 bit decrementing counter 72 with underflow flag. OR2 is a two-way 2-bit selector 74, and a CTRLR 86 is the SCALER 23 state machine controller.

MU (makeup) codes follow a similar pattern to terminator (TC) codes except OR4 85 remains set to 1111b and OR2 74 is set to 11b. This simulates a count of 64 pels, which is then counted out as if it were a TC code of the same value, except OR4 85 remains set at 1111b. When the sequence ends, CTR6 is decremented and the cycle repeats until CTR6 77 underflows.

In an image enlargement scaling operation, SCALER 23 always outputs at least R bits, and usually extra bits must be added to R. The Scaling Template Register 73 represents the R input bits with '1"s and the extra bits as '0"s. The STR must be measured and the number of STR bits required in order to count R '1"s must be deferred. This is the desired scaled output run length. The TREE circuit 93, therefore, must be able to provide an output L equal to the length of a input code length R scaled according to the instructions in STR. It must do this by returning the size of an input field, L, required to count R '1"s.

Under some circumstances, this answer can be 16 or greater than 16. Whenever this happens, SCALER 23 outputs a run length of 16 and then ask how many STR '1"s were there in the field of 16 we just output. This number, K, represents the number of bits consumed from the input stream, and it is subtracted from R to produce the number of input bits of our original run length R still remaining to be processed. SCALER 23 is then ready to repeat the cycle by using this new value of R. this later situation is identical to the reduction algorithm except the TREE circuit 93 input is forced to the number 16 by the state machine 86 controlling the overall SCALER operation.

For illustration, the earlier example using an 11/7 scale factor is repeated. SPTR 71 must be advanced to pass 4 '1"s and stop on the 5th '1' in the STR pattern 1010110110110101-1011011010110110b which has an 11 bit RRLI. This will be at bit position 8, which establishes the value of SPRT 71 as 0111b. Now we select bits 7 through 23 from STR 73 as the input to TREE circuit 93, and find the length, L, needed to pass 9 '1"s, stopping on the 10th '1'. The first (windowing)

operation produced the 16 bit window 11011010110110111b. The 10th '1' occurs at bit position 15 which produces the answer L=15. This is the correctly scaled run length and is output via SEL4 97. Note that, in this example, 9*11/7=14.1 so the approximation rounded up aggressively. This shows that a perfect answer is not obtained when fractions are produced. What is important, however is that errors are not accumulated and this answer can be reproduced every time SCALER 23 runs this algorithm.

If the run length in the previous example had been greater than 11, SCALER 23 would have received an output from the TREE circuit 93 indicating this condition. For example, given a received input run R of 14. SCALER 23 will output a run length L=16 and then ask the TREE circuit 93 to return how many '1''s there are in a run of that length R=14. In this example, this is K=11. SCALER 23 subtracts K=11 from R=14 leaving a remainder R=3. SPTR 71 is advanced by L=16 at the same time this new R value is selected. At this point, SCALER 23 has passed the 16th bit boundary in STR 73 and TCR 75 must be added to SPTR 71, so that SPTR=7+16+5=28=12, i.e., the 13th bit in STR 73. The next (and last operation) is to ask how many STR bits are consumed, starting at bit 13, in order to pass 3 '1''s and stop at the 4th '1'. The window pattern is 1011011011010110b and this produces a result L=6. So the final result is a run length of 14 * 11/7 = 22 which is output as 16+6.

Referring back to FIG. 4, another component of SCALER 23 is GCT3, a resettable up-down N-bit accumulator 76 that adds or subtracts the value K, depending upon the current value of COLOR, whenever a color run is completely eliminated. We have shown a signed 2 bit implementation, but in general, this could be up to 4 bits. The tradeoff is more memory in OUTFIFO for higher definition gray codes. This will only happen during image reduction when the field R contains all '1''s, and is detected by the fact that SUB4 95 generates a borrow. For example, an input run of 1 pel is represented by the code value 0000b. Deleting this run corresponds to R=0 minus K=1, and yields "−1", a control state that will cause the value K=1 to be added (or subtracted) from GCT3 76. Accumulator 76 (i.e., GCT3) is set to '00b' after the SCALER 23 outputs a black pel code, and similarly to the value '11b' following output of a white pel code. It will always contain the correct color code for the first pel of the following run, since it remains unmodified when the next run is not deleted. In the preferred embodiment, GCT3 is a 3 bit arithmetic logic unit 76 used to add or subtract deleted color counts, and MAX3 is a data element 88 which passes K=0 through 3 and sets output=3 when K>3.

Figure 5:
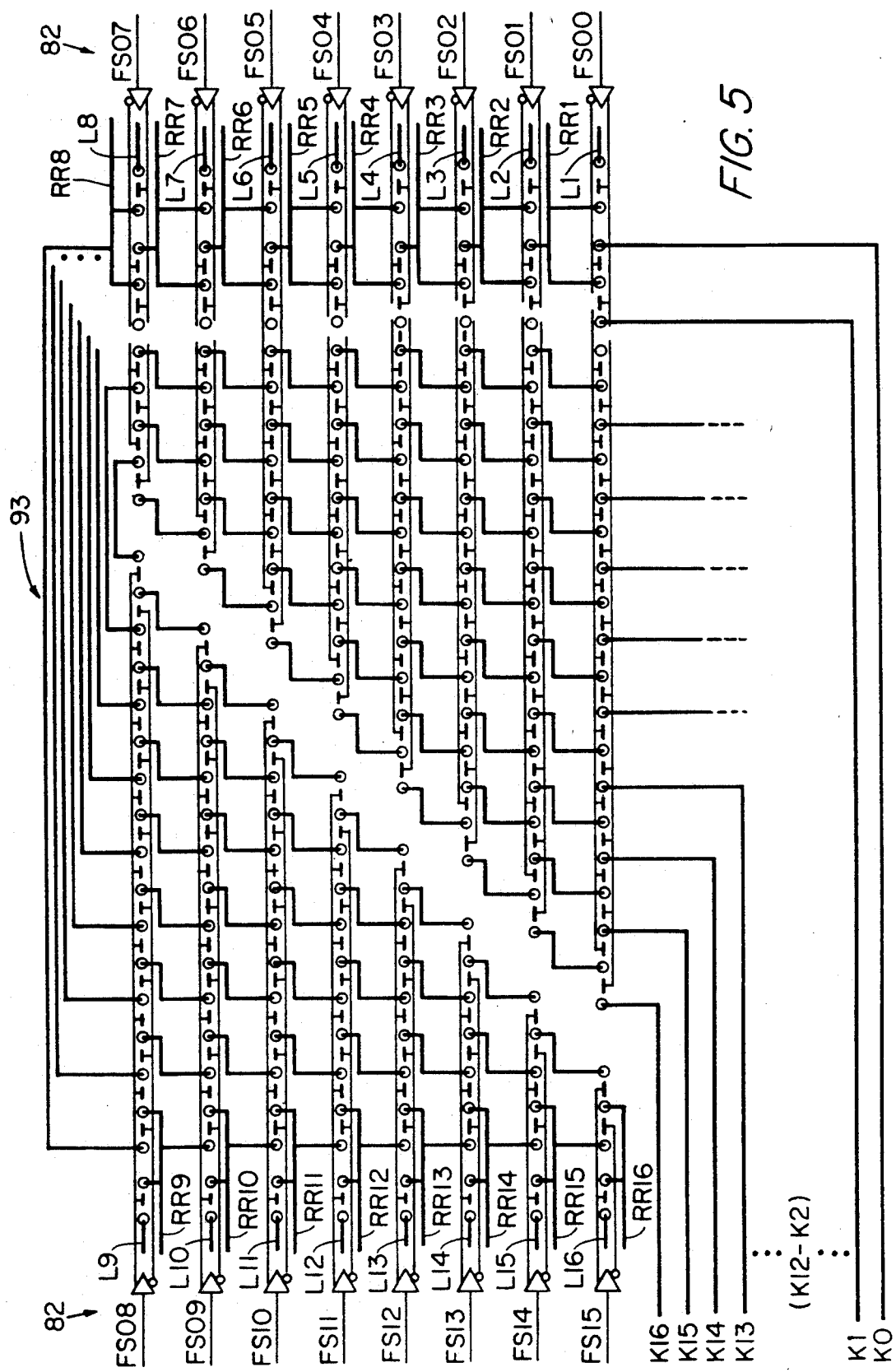
FIG. 5 is an electrical schematic of a template analysis circuit of the scaler of FIG. 4.

In a preferred embodiment of the SCALER 23 of the TREE circuit 93 is as shown diagrammatically in FIG. 5. For purposes of illustration and not limitation, the heavy lines represent Metal 1 connections, the thin solid lines are Poly, and NMOS transistors are represented by the dotted heavy lines. The circles represent Metal 1 to Active contacts. The circuit 93 works as follows.

The Funnel Shifter 70 outputs are applied to the 16 FSXX buffers 82, 8 on each side, that drive a network of rows of switching nodes comprised of pairs of NMOS pass transistors. The worst FSXX gate load is 17 gates, at FS00. At the same time, PMOS transistors percharge all RR and K lines so that all nodes in the switch network, regardless of the value of FS 70, are charged to a positive state. The next clock phase causes only one RR node, corresponding to the input value R, to be driven low by the action of a 4:16 decoder circuit (not shown). This discharges a string of source-drain switching junctions through a worst case path length of 17 NMOS pass transistors. Exactly one of the 17 K output lines will be discharged, and that output will correspond to the number of '1''s present on the FS 70 bit inputs between the RR starting point and the K output plane.

At each node, the FSXX bit steers the discharge path onto the next node at the current horizontal level or onto the next node up one level. The first condition represents FSXX=0 and the second represents FSXX=1. Eventually, the discharge path arrives at only one K output, and is decoded into its equivalent binary value by a gain stage followed by a 16:4 encoder, both of which are not shown in FIG. 5.

There appears to be no sneak paths in the TREE network 93 since each step to the next level isolates all nodes on the current level that precede the step up, and the worst case path contains 17 nodes. The only string experiencing backflow is the RR entry node plane, which can run backwards through all preceding '0''s. This chain stops at any preceding '1'node.

The operation just described corresponds to the image reduction requirement to count the number of '1''s in a field of RR. It is noted that this circuit 93 is completely bidirectional. So, if one selects FS 70 and precharge as before, but now we drive a K node low, corresponding to the number of '1''s desired to be counted in FS 70, at most one and only one L node will be discharged, because, in effect, the process works backwards through the maze from its output to its input and there are no sneak or false paths. If there are not enough '1''s to make it back to an L output, none of the L lines will be discharged. The extra pass transistors between the RR plane from the L plane provide the necessary isolation to ensure that L can only be detected on a row where FSXX is set to a '1'. Note that one can still use the 4:16 and 16:4 networks, as before, by adding a pair of pass transistors to each input or output, and steering these with a single mode control bit. The L>16 condition is detectable with a string of 16 PMOS transistors and one NMOS precharge transistor.

TREE network 93 timing and area considerations are discussed in more detail later. In sum, FS00-FS15 are funnel shifter 70 output bits. All fields are measured from FS00. Lines RRI-RR16 select size of the field to bracket while counting 1's. One of the 16 input lines will be driven low as determined by the value R of REM4 (register 87 of FIG. 4). For lines K0-K16, whenever an RR signal is driven low, one K output line will go low indicating the number of 1's within the selected (STR 73) field size REM4. Lines L1-L16 select size of (STR 73) needed to encompass K 1's. For this operation all RR lines remain undriven and the K line corresponding to the input code length (REM4) is driven low. The TREE 93 in effect, works backwards. LGT16 is a signal (not shown) that is part of the length output group, and is low if the input K is greater than the total number of 1's within the current 16 bit (STR 73) window.

Figure 6:
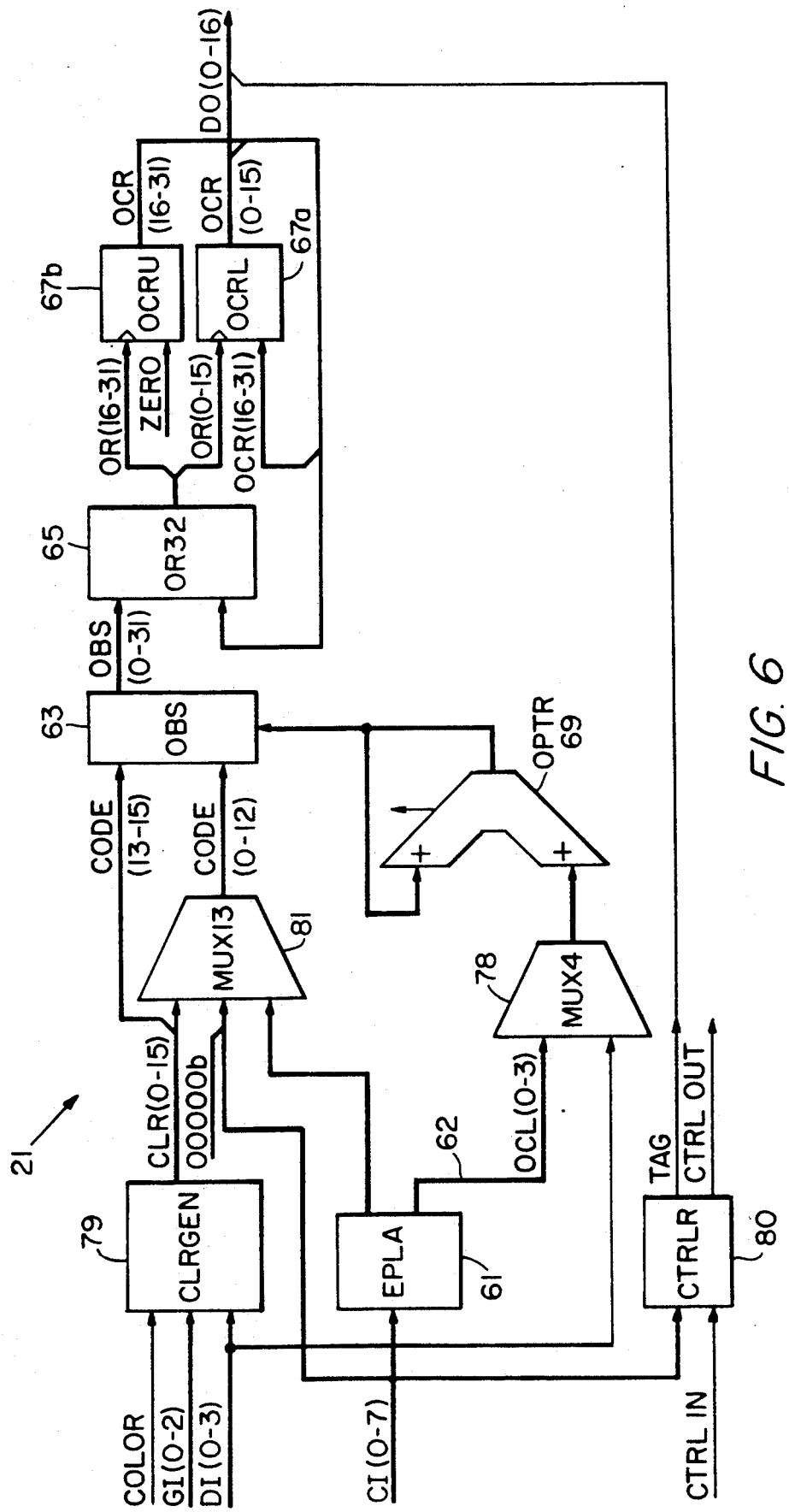
FIG. 6 is a block diagram of a code generator of the embodiment of FIG. 1.

Returning to the CODEGEN 21 as shown in detail in FIG. 6, the CLRGEN circuit 79 simply converts input scaled color run length codes into their correct lengths for input to the OBS 62 during normal image expansion (decoding) operations. During image reduction, however, the CLRGEN circuit 79 can be programmed to generate multiple bits per pel, with the first pel modified to represent the gray level specified by the SCALER GCT3 output 76 (FIG. 4). An example will explain this best.

Lets assume that one has 2 bits per pel, and that the code '00b' corresponds to pure white, '11b' is pure black, and one has two more colors, light gray '01b' and dark gray '10b'. Then, for a pure black color run of 5 pels, signal GI would be set to '011b' and we would output '11-11111111b'. Now lets assume signal GI='110b', representing a loss of 1 white pel, and one is once again outputting black. The CLRGEN 79 will produce '10-11111111b', which is dark gray followed by black.

If one had lost two white pels, the value would be '101b' and one would output light gray. A loss of three or more white pels would result in a pure white pel followed by four black pels, i.e., '00-11111111b'.

Whenever CLRGEN 79 is operating in the multiple bit per pel gray mode, it will need to generate two output coding passes whenever the input run count exceeds 8. Only the first pixel of the first pass contains the GI code.

Referring back to FIG. 1, the GRAYGEN 29, is responsible for performing N/M style Y scaling and for managing OUTFIFO buffer 27.

In order to scale the Y dimension in a manner similar to the X dimension, entire lines must be copied, deleted, or duplicated. Duplication and deletion require at least one fully buffered output line. Duplication corresponds to repeating the previous line. Deletion requires the deleted lines to be saved so a later reconstruction of equivalent gray levels is enabled. In the present invention in order to correctly accommodate DMA flag codes it is necessary to save at least one scan line in OUTFIFO 27.

As to the size of OUTFIFO 27 ignoring gray levels for the moment, and assuming that the X and Y scale factors are roughly equivalent, the X line length scales down as the image reduction level increases. More lines will need to be stored but each line will be shorter.

Gray levels usually come into play at high reduction factors, of the order of 8, where one is attempting to use VGA level resolutions. Table 3 presents a comparison of several OUTFIFO sizing requirements. The conclusion is that approximately 8 K bits is needed, the same size as the RLFIFO buffer 19 if one assumes that no attempts are made to generate gray scale for engineering drawing sizes. The Y gray detection algorithm described defers all summation to the point where data is actually output. At high reduction levels, one would be better off saving the gray level as one accumulated deleted lines, then one only needs at most 2 or 3 lines of buffering, and the buffer in this instance will hold the output gray codes. This requires an ALU operation for each OUTFIFO 27 access. If, as it seems likely, the OUTFIFO access time is of the same order of magnitude or greater than the GRAYSUM 90 (FIG. 7) delays, then this is preferred for high levels of gray reduction. This memory should include a tag bit and be organized as 512 words by 17 bits, since Applicant has chosen to carry most of the DMA state information down the pipeline from the PARSER 17 to the DSTDMA 35. This tag bit will also be used to identify the length of lines requiring duplication. Thus all line length registers are eliminated from the Y scaling and DMA functions, and most of the computations needed to maintain them are similarly eliminated.

TABLE 3

OUTFIFO Sizing Requirements

| Scale Factor | Gray | Lines Req'd | Line Length | Bufr Size |
| --- | --- | --- | --- | --- |
| Any Expand | No | 1 | L | L |
| 1:1 | No | 1 | L | L |
| Reduce 2:1 | No | 1 | L/2 | L/2 |
| Reduce 3:1 | No | 2 | L/3 | 2*L/3 |
| Reduce 4:1 | No | 3 | L/4 | 3*L/4 |
| Reduce 8:1 | No | 7 | L/8 | 7*L/8 |
| Reduce 3:2 | No | 1 | 2*L/3 | 2*L/3 |
| Reduce 5:2 | No | 2 | 2*L/5 | 2*2*L/5 |
| Reduce 2:1 | Yes | 1 | 2L/2 | L |
| Reduce 4:1 | Yes | 3 | 2L/4 | 3*2L/4 |
| Reduce 8:1 | Yes | 7 | 2L/8 | 7*2L/8 |

Figure 7:
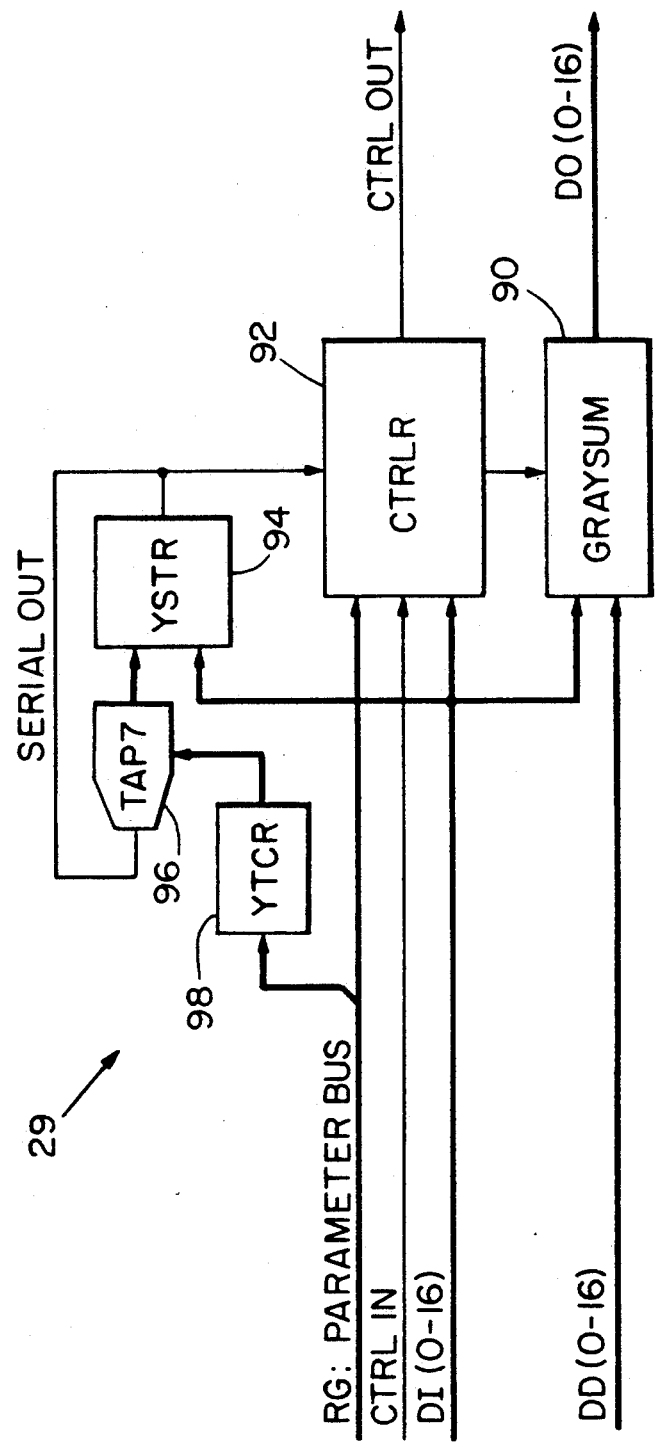
FIG. 7 is a block diagram of a gray color generator and Y-scaling member of FIG. 1.

FIG. 7 illustrates how GRAYGEN 29 performs Y scaling. A 16 bit serial shift register 94, YSTR, is loaded with the correctly adjusted Y scaling Template Register. This is a full 16 bits, and it arrives at GRAYGEN 29 by traveling down the pipeline from the PARSER 17 following a Y state SOW code, similar to the manner in which SPTR previously travelled down to the SCALER 23. Note, that unlike the X algorithm, which needed to be re-initialized once each scan line, the Y scaling algorithm is destructive, just like the Y windowing algorithm, since each Y line is only processed once. This allows the current Y state to be kept in YSTR 94 to track the Y scaling codes.

A 3-bit Y Template Correction Register 98, YTCR, selects the length of the Y Scaling Template Register 94. Effectively, YTCR sets a tap point where YSTR serial input is applied. YTCR 98, only needs to be programmed once during the initial X and Y scale factor setup.

Lines are determined by the presence of SOL and EOL codes, discussed shortly. As each line is completed, YSTR 94 is shifted right one bit to activate the next Y scaling command. The bits have the following definitions:

| Image Reduction: | '1' = delete, but save, this line, '0' = output (and possible merge) this line. |
| --- | --- |
| Image Enlargement: | '1' = output and save this line, '0' = output the saved line and save it again. |

During image enlargement, each line is output of OUTFIFO 27. As indicated, OUTFIFO 27 is organized as a 17 bit memory, with a tag bit used to identify the end of a line. A line is duplicated by reading the line from OUTFIFO 27 and writing it back, stopping when the tag is once again encountered.

During image reduction, all deleted lines are written into OUTFIFO 27, using the following method:

1 - The first deleted line is written into consecutive locations.
2 - The second deleted line is written by first writing the first line back followed by the second line, making the lines appear in alternating OUTFIFO positions.

This process is repeated for N lines, and results in each deleted 16 bit wide vertical chunk appearing in N consecutive words. When the process finally gets around to the first line not requiring deletion, GRAYGEN 29 "adds" this word to the sum of the next N OUTFIFO words and outputs the "sum" as the gray corrected result. As it is required to sum across each bit position (i.e., need 16 serial 2 bit adders), this is all accomplished by GRAYSUM 90 and controlled by CTRLR 92.

Preferably, GRAYSUM 90 is a 16 bit arithmetic circuit capable of summing "vertical" bits from previously buffered lines to create a gray corrected final output line. CTRLR 92 is a state machine controlling input and output data flow and OUTFIFO 27 address pointer. The CTRLR 92 establishes the data patterns stored in OUTFIFO's 27 delayed data region during image reduction scaling operations.

The OUTFIFO 27 needs to identify the start and end of each line, and to provide a means to pass information to the DSTDA 35 for "point-of-use". The mechanism chosen is a 17th tag bit with OUTFIFO 27 encoded according to the scheme presented in Table 4. These codes are created by CODEGEN 21 and utilized by GRAYGEN 29 and DSTDMA 35.

TABLE 4

OUTFIFO Code Assignments

| Description/Bit: | T | 15 | 14 | 13 | 000 | 2 | 1 | 0 |
|---|---|---|---|---|---|---|---|---|
| DATA | 0 | | | | DATA | | | |
| XSOW | 1 | 0 | 0 | | XADRS | | | |
| XSOW (Next Word) | 0 | | | | LMASK | | | |
| XEOW (Next Tag) | 1 | | | | RMASK | | | |
| YSOW | 1 | 1 | 1 | | BASEADRSL | | | |
| YSOW (Next Word) | 0 | | | | BASEADRSH | | | |
| YSOL | 1 | 0 | 1 | | PITCH | | | |

Discussed next is the DMA, and, more specifically, the DMA addressing logic of the present invention apparatus 11. Applicant has currently managed to keep all "point-of-use" information pertaining to the output DMA addressing in the processor apparatus 11 pipeline from its point of generation at the PARSER 17 all the way to the point of use at DSTDMA 35. FIG. 8 shows the basic DMA logic, and conceptually this logic is correct for either SRCDMA 31 or DSTDMA 35. In fact, due to pin limitations, both DMA addressing functions may be combined into one unit. Note simply that apparatus 11 provides address generation for the SRCBUS 13 only, and that SRCBUS 13 can be used in a half-duplex mode to provide both source and destination functionality. FIG. 8 summarizes the DMA operation.

The DMA requires an ADRS register 20, and a BASEADRS register 22. Preferably ADRS 20 is a 30 bit address register to DST (SRC) bus 15 (13). BASEADRS 22 is a 30 bit base address register loaded in two passes from OUTFIFO 27.

All data required to run the DMA addressing function arrives at the DMA Adder, which is the final destination for most of the programmed RLFIFO parameters. These parameters include the BASEADRS 22, which is programmed at the instant that a new Y region begins and corresponds to the Y SOW state. BASEADRS 22 is updated by PITCH at each following X SOL state. Each X SOW state provides a new XADRS parameter which is added to BASEADRS 22 to initialize the ADRS register 20. Each X SOW (Start of Window) state then supplies the left border LMASK parameter and activates the DMA bus controller 32 to fetch the (first) DATA word from OUTFIFO 27, mask this word and the data read from ADRS 20, and write back the merged word, thus perform a read-modify-write cycle. ADRS 20 is then incremented by one word. A repetitive cycle then follows fetching data from OUTFIFO 27, writing the data at ADRS 20, and advancing ADRS 20. The repetitive cycle continues until the next tag bit is detected, marking the X EOW (End of Window) state. The X EOW code supplies the right border RMASK parameter, and the DMA 31, 35 will then perform a second read-modify-write masking operation and shut bus (13, 15) activities down until the next X SOW code.

It is noted that no registers are required to hold either MASK, PITCH, or XADRS parameters. This data, and the initial values for BASEADRS 22 and ADRS 20, have all arrived over the main pipeline data bus from RLFIFO 19. Note also that parameters would normally be required for each Y and X region, and that this multiple region requirement can only be met in conventional machines by adding a separate set of data and parameter registers for each region, or by attempting to interrupt the host processor as each region is entered to have the host load the next parameters. The current "point-of-use" method of the present invention permits the programmer to setup the entire apparatus 11 operation once during the initialization sequence by writing most of the data into RLFIFO 19.

In a preferred embodiment of FIG. 8, there is an input multiplexer 28 (MUX16) that selects value representing one word or OUTFIFO 27 input. Also a 16 bit miltiplexor 24 (MUX16A) selects BASEADRSH, BASEADRSL, ADRSH, ADRSL (22, 20 respectively), or all zeros. An arithmetic logic unit 26 (ALU16) adds 16 bit values to BASEADRS 22, ADRS 20 or loads 16 bit values into either register 20, 22 half A 16 bit data path element 34 (MASK16) buffers data to DST (SRC) bus 15 (13) and performs boundary bit masking A state machine 32 (CTRLR) is responsible for detecting X and Y SOW, EOW, SOL, and initializing registers CTRLR 32 also controls OUTFIFO 27 handshaking, DMA address incrementation, and boundary data masking as described above Equivalents While the invention has been particularly shown and described with reference to a preferred embodiment thereof, it will be understood by those skilled in the art that various changes in form and details may be made therein without departing from the spirit and scope of the invention as defined by the appended claims.

We claim:

1. An image processing system having (i) a source end for providing an input stream of one of encoded image data and working image data, and (ii) an output end for providing one of decoded image data and compressed image data, comprising:
    a parser coupled to the source end for generating code instructions for processing encoded image and working image data, the code instruction including clipping and scaling parameters; and
    a scaler coupled between the output end and the parser for forming decoded image data according to the code instructions generated by the parser, upon receipt of encoded image data at a point in the input stream, the scaler forming decoded image data corresponding to the encoded image data at the same point in the input stream.

2. An image processing system of claim 1 further comprising:
    an internal buffer coupled between the parser and the scaler for storing processing information including line length, scaling parameter and address offsets to support each horizontal and vertical working window region formed by encoded image data; and the parser managing the internal buffer such that the scaler receives processing information corresponding to encoded image data at time of the scaler processing the encoded image data.

3. An image processing system as claimed in claim 2 wherein the parser manages the internal buffer such that a line length of encoded image data is separated from a line count, which is eliminated.

4. An image processing system as claimed in claim 2 further comprising a code generator coupled between the internal buffer and the scaler for enabling windowing during processing of working image data.

5. An image processing system of claim 2 further comprising:
- a direct memory address assembly for accessing at least one destination memory; and
- the internal buffer further stores end of line and end of window codes within the processing information, the scaler passing the end of line and the end of window codes and any succeeding processing information to the direct memory address assembly for accessing destination memory.

6. An image processing system of claim 5 wherein the direct memory address assembly includes one destination address register, the destination address register being able to indicate source memory address as well as destination memory address desired.

7. An image processing system as claimed in claim 2 wherein there are an arbitrary number of window regions.

8. An image processing system as claimed in claim 7 wherein the window regions are processed in a single pass through the input stream.

9. An image processing system of claim 1 wherein the scaler further generates gray color codes for formed decoded image data corresponding to encoded image data, such that gray level image data is output for decoded image data.

10. An image processing system as claimed in claim 1 wherein the images being processed are document images.

11. In an image processing system, a method of processing image data comprising the steps of:
- receiving an input stream of input image data from a source, input image data being either encoded or working image data;
- parsing input image data to generate code instructions for processing input image data, including decoding input image data that is encoded and encoding input image data that is working image data;
- holding input image data with embedded start of window codes in an internal buffer;
- for input image data that is working image data, transmitting the generated code instructions to a code converter for encoding working image data according to desired color codes;
- for input image data that is encoded transferring input image data from the internal buffer, and at a time of encountering start of window code embedded therein, transmitting the generated code instructions to a scaling routine for forming decoded image data according to the generated code instructions, the decoded image data, corresponding to input image data at a respective point in the input stream, being formed at the same point in the input stream such that repainting of randomly selected window regions is enabled; and
- outputting input image data that is encoded to enable facsimile transmission of images supported by input image data, and outputting the formed decoded image data to enable computer display of images supported by input image data.

12. A method as claimed in claim 11 wherein input image data that is encoded is run length encoded, and the scaling routine decodes the run length codes to color codes including gray color.

13. A method as claimed in claim 11 wherein the code converter run length encodes working image data for enabling facsimile transmission of an image supported by input image data.

14. A method as claimed in claim 11 wherein:
- the step of holding input image data includes storing end of line codes, end of window codes and memory address information with the input image data; and
- the step of outputting includes at the time of encountering one of an end of line code and end of window code, passing one of the end of line code and the end of a direct memory access assembly for accessing at least one destination memory to which to output at least such that said accessing destination memory is synchronized with encoding working image data and forming decoded image data for output.

15. A method as claimed in claim 11 wherein the images are document images and the step of outputting comprises transmitting and displaying document images.

16. A document image processing system having (i) a source end for providing an input stream of one of encoded image data and working image data, encoded image data forming at least one window region, and (ii) an output end for providing one of decoded image data and compressed image data, comprising:
- a parser coupled to the source end for generating code instructions for processing encoded image and working image data, the code instructions including slipping and scaling parameters;
- a scaler coupled between the output end and the parser for forming decoded image data according to the code instructions generated by the parser, upon receipt of encoded image data at a point in the input stream, the scaler forming decoded image data corresponding to the encoded image data at the same point in the input stream and generating gray color codes for formed decoded image data corresponding to encoded image data, such that gray level image data is output for decoded image data;
- an internal buffer coupled between the parser and the scaler for storing processing information including line length, scaling parameter and address offsets to support each horizontal and vertical working window region formed by encoded image data, the parser managing the internal buffer such that the scaler receives processing information corresponding to encoded image data at time of the scaler processing the encoded image data; and
- a code generator coupled between the internal buffer and the scaler for enabling windowing during processing of working image data.

17. A document image processing system of claim 16 further comprising:

a direct memory address assembly for accessing at least one destination memory, the direct memory address assembly includes one destination address register, the destination address register being able to indicate source memory address as well as destination memory address; and the internal buffer further stores end of line and end of window codes with the processing information, the scaler passing the end of line and the end of window codes and any succeeding processing information to the direct memory address assembly for accessing destination memory.

18. A document image processing system as claimed in claim 16 wherein there are an arbitrary number of window regions formed by the input stream of encoded image data.

19. In a document image processing system, a method of processing image data comprising the steps of:

receiving an input stream of input image data from a source, input image data being either encoded or working image data;

parsing input image data to generate code instructions for processing input image data, including decoding input image data that is run length encoded and encoding input image data that is working image data;

holding input image data with embedded start of window codes in an internal buffer;

for input image data that is working image data, transmitting the generated code instructions to a code converter for encoding working image data according to desired color codes;

for input image data that is encoded transferring input image data from the internal buffer, and at a time of encountering start of window code embedded therein, transmitting the generated code instructions to a scaling routine for forming decoded image data according to the generated code instructions, the decoded image data, corresponding to input image data at a respective point in the input stream, being formed at the same point in the input stream such that repainting of randomly selected window regions is enabled, the scaling routine decoding the run length codes to color codes including gray color; and outputting input image data that is encoded to enable facsimile transmission of document images supported by input image data, and outputting the formed decoded image data to enable computer display of document images supported by input image data.

20. A method as claimed in claim 19 wherein:

the step of holding input image data includes storing end of line codes, end of window codes and memory address information with the input image data; and the step of outputting includes at the time of encountering one of an end of line code and end of window code, passing one of the end of line code and the end of a direct memory access assembly for accessing at least one destination memory to which to output at least such that said accessing destination memory is synchronized with encoding working image data and forming decoded image data for output.

* * * * *

UNITED STATES PATENT AND TRADEMARK OFFICE
CERTIFICATE OF CORRECTION

PATENT NO. : 5,245,441

DATED : September 14, 1993

INVENTOR(S) : Murray A. Ruben

It is certified that error appears in the above-identified patent and that said Letters Patent is hereby corrected as shown below:

Column 24, line 55, after "code" delete "instruction" and insert therefore --instructions-- .

Column 26, line 43, after "including" delete "slipping" and insert --clipping-- .

Column 27, line 8, after "codes" delete "with" and insert therefore --within--.

Signed and Sealed this

Fourteenth Day of June, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,245,441
DATED : September 14, 1993
INVENTOR(S) : Murray A. Ruben

It is certified that error appears in the above-identified patent and that said Letters Patent is hereby corrected as shown below:

Column 26, line 24, after "end of" insert --window code along with the memory address information to--.

Column 26, line 26, after "least" and before "such" insert --one of encoded image data and formed decoded image data,--.

Column 28, line 28, after "end of" insert --window code along with the memory address information to--.

Column 28, line 30, after "least" and before "such" insert --one of encoded image data and formed decoded image data,--.

Signed and Sealed this

Eighteenth Day of October, 1994

Attest:

BRUCE LEHMAN

*Attesting Officer*   *Commissioner of Patents and Trademarks*